United States Patent
Yamada

(10) Patent No.: US 9,456,146 B2
(45) Date of Patent: Sep. 27, 2016

(54) EXPOSURE CONTROL DEVICE, IMAGING DEVICE, IMAGE DISPLAY DEVICE, AND EXPOSURE CONTROL METHOD

(71) Applicant: PANASONIC CORPORATION, Osaka (JP)

(72) Inventor: Shin Yamada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 14/366,019

(22) PCT Filed: Dec. 20, 2012

(86) PCT No.: PCT/JP2012/008177
§ 371 (c)(1),
(2) Date: Jun. 17, 2014

(87) PCT Pub. No.: WO2013/094212
PCT Pub. Date: Jun. 27, 2013

(65) Prior Publication Data
US 2014/0362281 A1  Dec. 11, 2014

(30) Foreign Application Priority Data
Dec. 22, 2011  (JP) .................. 2011-281704

(51) Int. Cl.
*H04N 5/235* (2006.01)
*H04N 5/238* (2006.01)
*H04N 5/232* (2006.01)

(52) U.S. Cl.
CPC ............ *H04N 5/238* (2013.01); *H04N 5/2351* (2013.01); *H04N 5/2355* (2013.01); *H04N 5/23219* (2013.01); *H04N 5/23222* (2013.01); *H04N 5/23293* (2013.01)

(58) Field of Classification Search
CPC .............................. H04N 5/238; H04N 5/235
USPC .................................................. 348/234, 362
See application file for complete search history.

(56) References Cited

U.S. PATENT DOCUMENTS

| 5,128,769 A | 7/1992 | Arai et al. |
| 5,280,359 A * | 1/1994 | Mimura ............. H04N 5/23293 348/230.1 |

(Continued)

FOREIGN PATENT DOCUMENTS

| JP | 02-141731 | 5/1990 |
| JP | 05-130491 | 5/1993 |

(Continued)

OTHER PUBLICATIONS

Search report from E.P.O., mail date is Mar. 27, 2015.

(Continued)

*Primary Examiner* — Anthony J Daniels
(74) *Attorney, Agent, or Firm* — Greenblum & Bernstein P.L.C.

(57) ABSTRACT

It includes a face detection unit that acquires an image from a camera and detects a person's face from the image, a region division unit that acquires an image from the camera and divides an imaging region of the image, a luminance calculation unit that calculates luminance of the person's face detected by the face detection unit and luminance of each divided region obtained by dividing by the region division unit, and a diaphragm adjustment information calculation unit that obtains the divided region having a difference between the luminance of the person's face and the luminance of the divided region which is larger than a predetermined value, calculates a region excluding the obtained divided region as a diaphragm adjustment region of an imaging unit, and outputs the obtained diaphragm adjustment region as diaphragm adjustment information to a diaphragm adjustment unit of the camera.

10 Claims, 34 Drawing Sheets

(56) References Cited

U.S. PATENT DOCUMENTS

| | | | |
|---|---|---|---|
| 5,488,429 | A | 1/1996 | Kojima et al. |
| 5,561,474 | A | 10/1996 | Kojima et al. |
| 5,638,136 | A | 6/1997 | Kojima et al. |
| 7,948,524 | B2 | 5/2011 | Endo et al. |
| 7,990,429 | B2 * | 8/2011 | Saito .................... G06T 7/0081 348/222.1 |
| 8,355,059 | B2 * | 1/2013 | Fukui ................. H04N 5/23219 348/229.1 |
| 8,477,212 | B2 | 7/2013 | Oyabu et al. |
| 8,531,589 | B2 | 9/2013 | Liu |
| 8,730,353 | B2 * | 5/2014 | Park .................... H04N 5/2351 348/229.1 |
| 2005/0265626 | A1 | 12/2005 | Endo et al. |
| 2006/0245007 | A1 | 11/2006 | Izawa et al. |
| 2007/0052840 | A1 | 3/2007 | Okuno |
| 2012/0113297 | A1 | 5/2012 | Mori et al. |

FOREIGN PATENT DOCUMENTS

| | | |
|---|---|---|
| JP | 11-146405 | 5/1999 |
| JP | 2005-347873 | 12/2005 |
| JP | 2006-154964 | 6/2006 |
| JP | 2006-166231 | 6/2006 |
| JP | 2009-044526 | 2/2009 |
| JP | 2010-273233 | 12/2010 |

OTHER PUBLICATIONS

Search report from PCT/JP2012/008177, mail date is Mar. 12, 2013.

* cited by examiner

EXPOSURE CONTROL DEVICE, IMAGING DEVICE, IMAGE DISPLAY DEVICE, AND EXPOSURE CONTROL METHOD

TECHNICAL FIELD

The present invention relates to an exposure control device, an imaging device, an image display device and an exposure control method which are suitably used for a monitoring camera system that monitors a person.

BACKGROUND ART

In the environment in which the brightness of faces of store visitors fluctuates by backlight and front-light changing depending on the weather or time of the entrance of a shop or the like having a glass door adopted therein, it is difficult to set appropriate photometric regions. Regarding such a problem, Patent Literatures 1 and 2 disclose an example of a method of controlling a camera using a detected face region as a photometric region. In addition, Patent Literature 3 discloses an example of a method of changing a camera control parameter until a face can be detected. In addition, Patent Literature 4 discloses an example of a method of excluding a region in which brightness fluctuates due to the movement of people or the like and an overexposed region from a photometric region.

CITATION LIST

Patent Literature

Patent Literature 1: JP-A-2006-154964
Patent Literature 2: JP-A-11-146405
Patent Literature 3: JP-A-2005-347873
Patent Literature 4: JP-A-2009-044526

SUMMARY OF INVENTION

Technical Problem

However, in the method of performing photometry in a face region which is disclosed in Patent Literatures 1 and 2 mentioned above, when the illuminance of a photographing range changes significantly in a state where a face is not imaged, the face cannot be detected (for example, when a person is not imaged in a monitoring camera from the night to the next morning). In addition, even when such a method of performing photometry in a face region is combined with the method disclosed in Patent Literature 3, there is a problem in that a person passes by and is missed before an appropriate diaphragm is obtained in store visit monitoring. In addition, in the method disclosed in Patent Literature 4, there is a problem in that a significant fluctuation in the illuminance of a store visitor's face depending on the weather or time makes it difficult to perform appropriate diaphragm adjustment (for example, when outdoor light falls on a face).

The present invention is contrived in view of such circumstances, and an object thereof is to provide an exposure control device, an imaging device, an image display device and an exposure control method which are capable of performing appropriate diaphragm adjustment even when a face is not imaged for a long period of time or the brightness of the face is different depending on a period of time.

Solution to Problem

An exposure control device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; and a diaphragm adjustment information calculator, adapted to obtain the divided region having a difference between the luminance of the object region and the luminance of the divided region which is larger than a predetermined value, and to calculate a region excluding the divided region having the large difference between the luminances as a diaphragm adjustment region of the imaging unit.

According to the above-mentioned configuration, a region excluding the divided region having a difference between the luminance of the object region and the luminance of the divided region which is larger than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; and a diaphragm adjustment information calculator, adapted to obtain the divided region having a change in difference between the luminance of the object region and the luminance of the divided region which is larger than a predetermined value, and to calculate a region excluding the divided region having the large change in difference between the luminances as a diaphragm adjustment region of the imaging unit.

According to the above-mentioned configuration, a region excluding the divided region having a change in the difference between the luminance of the object region and the luminance of the divided region which is larger than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; and a diaphragm adjustment information calculator, adapted to obtain the divided region having a difference between the luminance of the object region and the luminance of the divided region which is smaller than a predetermined value, and to calculate the divided region having the small difference between the luminances as a diaphragm adjustment region of the imaging unit.

According to the above-mentioned configuration, the divided region having a difference between the luminance of the object region and the luminance of the divided region which is smaller than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; and a diaphragm adjustment information calculator, adapted to obtain the divided region having a change in difference between the luminance of the object region and the luminance of the divided region which is smaller than a predetermined value, and to calculate the divided region having the small change in difference between the luminances as a diaphragm adjustment region of the imaging unit.

According to the above-mentioned configuration, the divided region having a change in the difference between the luminance of the object region and the luminance of the divided region which is smaller than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention includes: an object detector, adapted to detect an object from an image which is input to the object detector from an imaging unit; a luminance calculator, adapted to calculate luminance of an object region detected by the object detector and luminance of the input image for each pixel; and a diaphragm adjustment information calculator, adapted to obtain the pixel having a difference between the luminance of the object region and the luminance of the pixel which is larger than a predetermined value, and to calculate a region excluding the pixel having the large difference between the luminances as a diaphragm adjustment region of the imaging unit.

According to the above-mentioned configuration, a region excluding the pixel having a difference between the luminance of the object region and the luminance of the pixel which is larger than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention includes: an object detector, adapted to detect an object from an image which is input to the object detector from an imaging unit; a luminance calculator, adapted to calculate luminance of an object region detected by the object detector and luminance of the input image for each pixel; and a diaphragm adjustment information calculator, adapted to obtain the pixel having a difference between the luminance of the object region and the luminance of the pixel which is smaller than a predetermined value, and to calculate the pixel having the small difference between the luminances as a diaphragm adjustment region of the imaging unit.

According to the above-mentioned configuration, the pixel having a difference between the luminance of the object region and the luminance of the pixel which is smaller than a predetermined value is set to a diaphragm adjustment region, and thus appropriate diaphragm adjustment can be performed even when a face is not imaged for a long period of time or the brightness of the face is different depending on a period of time.

An imaging device according to an aspect of the present invention includes: the exposure control device; the imaging unit; and a diaphragm adjustor, wherein the exposure control device obtains the diaphragm adjustment region using the image which is input to the exposure control device from the imaging unit, and the diaphragm adjustor performs diaphragm adjustment of the imaging unit using the diaphragm adjustment region calculated by the diaphragm adjustment information calculator.

According to the above-mentioned configuration, the diaphragm adjustor performs diaphragm adjustment using the diaphragm adjustment region calculated by the diaphragm adjustment information calculator of the exposure control device, and thus appropriate diaphragm adjustment can be performed even when a face is not imaged for a long period of time or the brightness of the face is different depending on a period of time.

An image display device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; means for obtaining a luminance range of a first divided region having a difference between the luminance of the object region and the luminance of the divided region which is larger than a predetermined value, and a luminance range of a second divided region having a difference between the luminance of the object region and the luminance of the divided region which is equal to or less than the predetermined value; and an LUT calculator, adapted to create an LUT for allocating a luminance range, which is larger than an LUT output of the luminance range of the first divided region, to an LUT output of the luminance range of the second divided region, when a luminance value of a pixel of the input image is changed and displayed.

According to the above-mentioned configuration, when the luminance value of the pixel of the input image is changed and displayed, the LUT for allocating a luminance range, which is larger than the LUT output of the luminance range of the first divided region, to the LUT output of the luminance range of the second divided region is created. Therefore, it is possible to set the object in a display image to have appropriate brightness, and to achieve an improvement in visibility.

An image display device according to an aspect of the present invention includes: an object detector, adapted to detect an object from an image which is input to the object detector from an imaging unit; a region divider, adapted to divide an imaging region of the input image; a luminance calculator, adapted to calculate luminance of an object region detected by the object detector and luminance of a divided region obtained by dividing by the region divider; means for obtaining a luminance range of a divided region having a difference between the luminance of the object region and the luminance of the divided region which is equal to or less than a predetermined value; and an LUT calculator, adapted to create an LUT for allocating a luminance range suitable as luminance of the object to the luminance range of the divided region having the difference between the luminance of the object region and the luminance of the divided region which is equal to or less than the predetermined value, when a luminance value of a pixel of the input image is changed and displayed.

According to the above-mentioned configuration, only the divided region having a difference between the luminance of the object region and the luminance of the divided region which is equal to or less than a predetermined value is extracted and the LUT is created so that the luminance range is set to be appropriate. Therefore, it is possible to set the object in a display image to have appropriate brightness, and to achieve an improvement in visibility.

An exposure control method according to an aspect of the present invention is an exposure control method of calculating a diaphragm adjustment region by a programmed computer, including: an object detection step of detecting an object from an image which is input from an imaging unit; a region division step of dividing an imaging region of the input image; a luminance calculation step of calculating luminance of an object region detected in the object detection step and luminance of a divided region obtained by dividing in the region division step; and a diaphragm adjustment information calculation step of obtaining the divided region having a difference between the luminance of the object region and the luminance of the divided region which is larger than a predetermined value, and calculating a region excluding the divided region having the large difference between the luminances as a diaphragm adjustment region of the imaging unit.

According to the above method, a region excluding the divided region having a difference between the luminance of the object region and the luminance of the divided region which is larger than a predetermined value is set to a diaphragm adjustment region, and thus appropriate diaphragm adjustment can be performed even when a face is not imaged for a long period of time or the brightness of the face is different depending on a period of time.

An exposure control device according to an aspect of the present invention is configured so that when exposure adjustment of a synthetic image is performed, wherein the synthetic image is obtained by dividing in region and synthesizing images which are photographed at different exposure times: an object is detected for each region photographed at each of the exposure times; a photometric region is set for performing exposure adjustment of the object detected for each region; and exposure adjustment is performed using the photometric region for each of the different exposure times.

According to the above-mentioned configuration, for example, when a portion on which outside light falls directly and a portion on which outside light does not fall directly under the influence of outside light or the like are present, in the photographed image, the portion on which outside light falls directly becomes bright, and the portion on which outside light does not fall directly becomes dark. Therefore, for example, in an image photographed with the exposure time lengthened and an image photographed with the exposure time shortened, the portion on which outside light does not fall directly in the image photographed with the exposure time lengthened and the portion on which outside light falls directly in the image photographed with the exposure time shortened are synthesized, thereby allowing an image of which the brightness is averaged to be obtained. In addition, exposure adjustment using the photometric region is performed for each different exposure time before the images are synthesized, thereby allowing an image of which the brightness is further averaged to be obtained. In this manner, in a photographing environment lacking in a dynamic range, appropriate exposure adjustment can be performed even in a situation where a dynamic range expansion process is performed.

In the above configuration, the photometric region is set from the object which is photographed for a predetermined time or more within the region for each region.

An exposure control device according to an aspect of the present invention is configured so that presentation is made so as to set a photometric region for performing exposure adjustment of an object within an image photographed in a first photographing range, and to set a second photographing range smaller than the first photographing range in a range including the photometric region.

According to the above-mentioned configuration, it is possible to know an image automatically including an appropriate photometric region.

An exposure control device according to an aspect of the present invention is configured so that presentation is made so as to set a photometric region for performing exposure adjustment of an object within an image photographed in a first photographing range, and to set a second photographing range in a direction of a boundary of the first photographing range when the photometric region is located at the boundary.

According to the above-mentioned configuration, it is possible to know an image automatically including an appropriate photometric region.

An exposure control device according to an aspect of the present invention is configured so that presentation is made so as to set a photometric region for performing exposure adjustment of an object within an image photographed in a first photographing range, and to set a second photographing range larger than the first photographing range when the photometric region is located at a boundary of the first photographing range.

According to the above-mentioned configuration, it is possible to know an image automatically including an appropriate photometric region.

Advantageous Effects of Invention

According to the present invention, appropriate diaphragm adjustment can be performed even when a face is not imaged for a long period of time or the brightness of the face is different depending on a period of time.

DESCRIPTION OF EMBODIMENTS

Hereinafter, preferred embodiments for carrying out the present invention will be described in detail with reference to the accompanying drawings.

Embodiment 1

Figure 1:
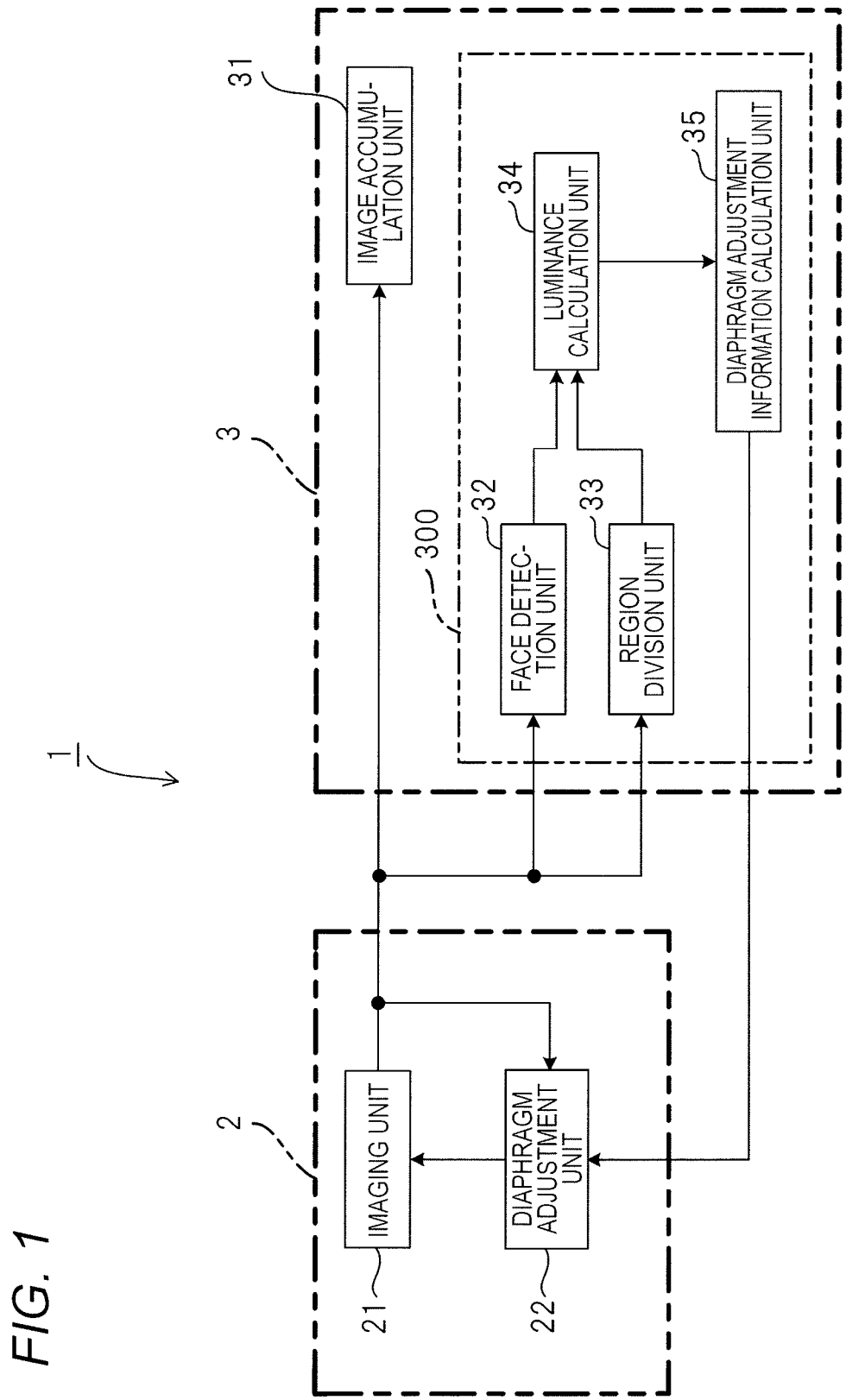
FIG. 1 is a block diagram illustrating a schematic configuration of an imaging device according to Embodiment 1 of the present invention.

FIG. 1 is a block diagram illustrating a schematic configuration of an imaging device according to Embodiment 1 of the present invention. In the drawing, an imaging device 1 according to Embodiment 1 estimates a region close to the brightness of a face from a time-series image such as a moving image which is output from an imaging tool such as a monitoring camera, and performs diaphragm adjustment so that the estimated region has predetermined brightness. The imaging device 1 according to Embodiment 1 includes a camera 2 and a recorder (recording device) 3. The camera 2 has an image sensor such as a CCD (Charge Coupled Device), a CMOS (Complementary Metal Oxide Semiconductor) or the like, and includes an imaging unit 21 that outputs an image photographed by the image sensor, and a diaphragm adjustment unit 22 that adjusts a diaphragm of the camera 2. The diaphragm adjustment unit 22 acquires an image from the imaging unit 21, and adjusts a diaphragm of the imaging unit 21 in accordance with diaphragm adjustment information (mask region setting command) which is output from the recorder 3.

The recorder 3 includes an image accumulation unit 31, a face detection unit 32, a region division unit 33, a luminance calculation unit 34 and a diaphragm adjustment information calculation unit 35 which function as an exposure control device 300. The image accumulation unit 31 has a storage device such as a hard disk or a flash memory, and records an image from the camera 2. The face detection unit 32 acquires an image from the camera 2, and detects a person's face (object region) from the acquired image. The region division unit 33 acquires an image from the camera 2, and divides an imaging region of the acquired image into, for example, 8×6 blocks. The luminance calculation unit 34 calculates the luminance of the person's face detected by the face detection unit 32 and the luminance of each divided region obtained by dividing by the region division unit 33. The diaphragm adjustment information calculation unit 35 obtains a divided region having a difference between the luminance of the person's face and the luminance of the divided region which is larger than a predetermined value, calculates a region excluding the divided region having the large difference between the luminances as a diaphragm adjustment region (photometric region=non-mask region) of the imaging unit 21, and outputs the calculated diaphragm adjustment region as diaphragm adjustment information to the diaphragm adjustment unit 22 of the camera 2.

Figure 2:
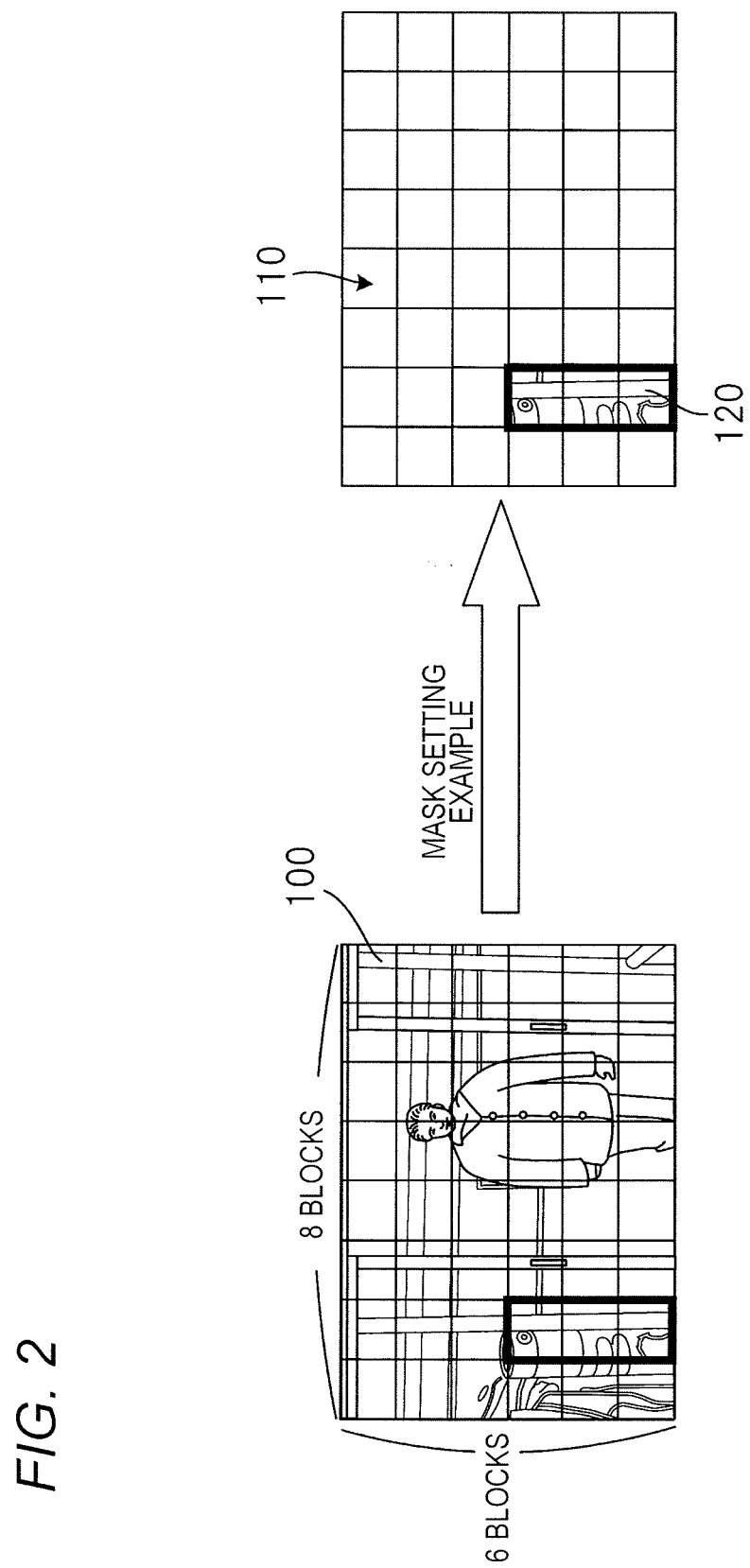
FIG. 2 is a diagram schematically illustrating the acquisition of a diaphragm adjustment region in the imaging device of FIG. 1.
Figure 3:
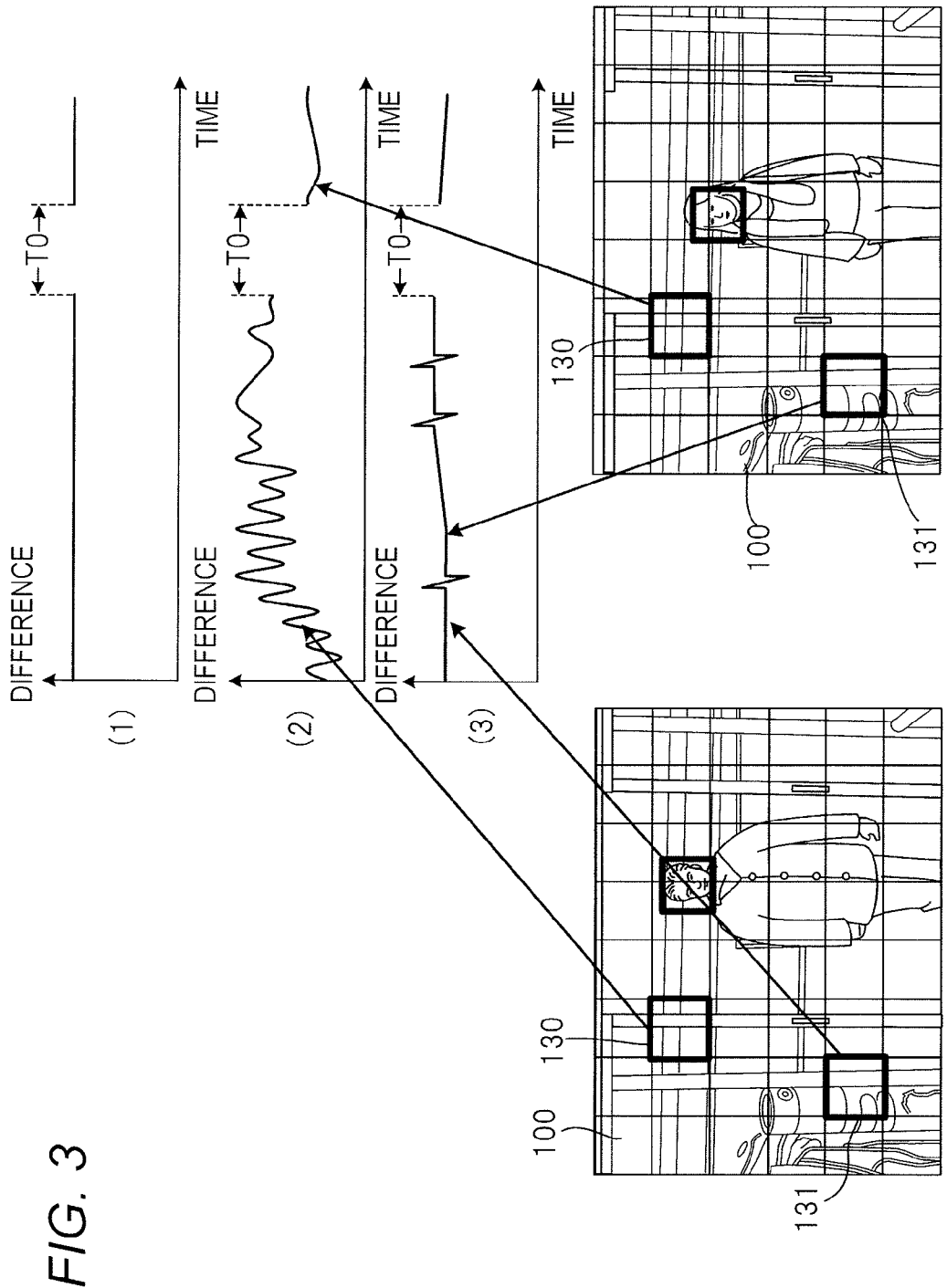
FIG. 3 is a diagram illustrating an example of a difference between luminances in two divided regions of an image shown in FIG. 2.

FIG. 2 is a diagram schematically illustrating the acquisition of a diaphragm adjustment region in the imaging device 1 according to Embodiment 1. In the drawing, an image 100 acquired from the camera 2 is divided (divided into, for example, 8×6 blocks), a region having a difference between the luminance of each divided region and the luminance of the person's face which is larger than a predetermined value is set to a mask region 110, and a divided region (three blocks in the drawing) except for this mask region 110 is set to a diaphragm adjustment region (photometric region) 120. FIG. 3 is a diagram illustrating an example of a difference between luminances in two divided regions of the image 100 shown in FIG. 2. A vertical axis of each of graphs (1) to (3) in the drawing represents a difference between luminances, and a horizontal axis represents a time. Graph (1) represents an ideal case with no temporal variation in difference, graph (2) represents a case of the temporal variation in difference being large, and graph (3) represents a case of the temporal variation in difference being small. In this case, graph (2) shows the temporal variation in difference in a divided region of a block 130, and graph (3) shows the temporal variation in difference in a divided region of a block 131. The divided region of the block 130 has a large temporal variation in difference, and thus becomes a mask target region. The divided region of the block 131 has a small temporal variation in difference and is in a state close to an ideal, and thus becomes a non-mask target region, that is, a diaphragm adjustment region. Meanwhile, time T0 is a period of time when a face is not imaged (the period of time when a face is not imaged may occur). The diaphragm adjustment region 120 shown in FIG. 2 is a place having a small influence of light with which the person's face is not imaged or crosscutting of a person, and diaphragm adjustment is performed so that brightness herein is set to be appropriate.

Next, operations of the imaging device 1 according to Embodiment 1 will be described.

Figure 4:
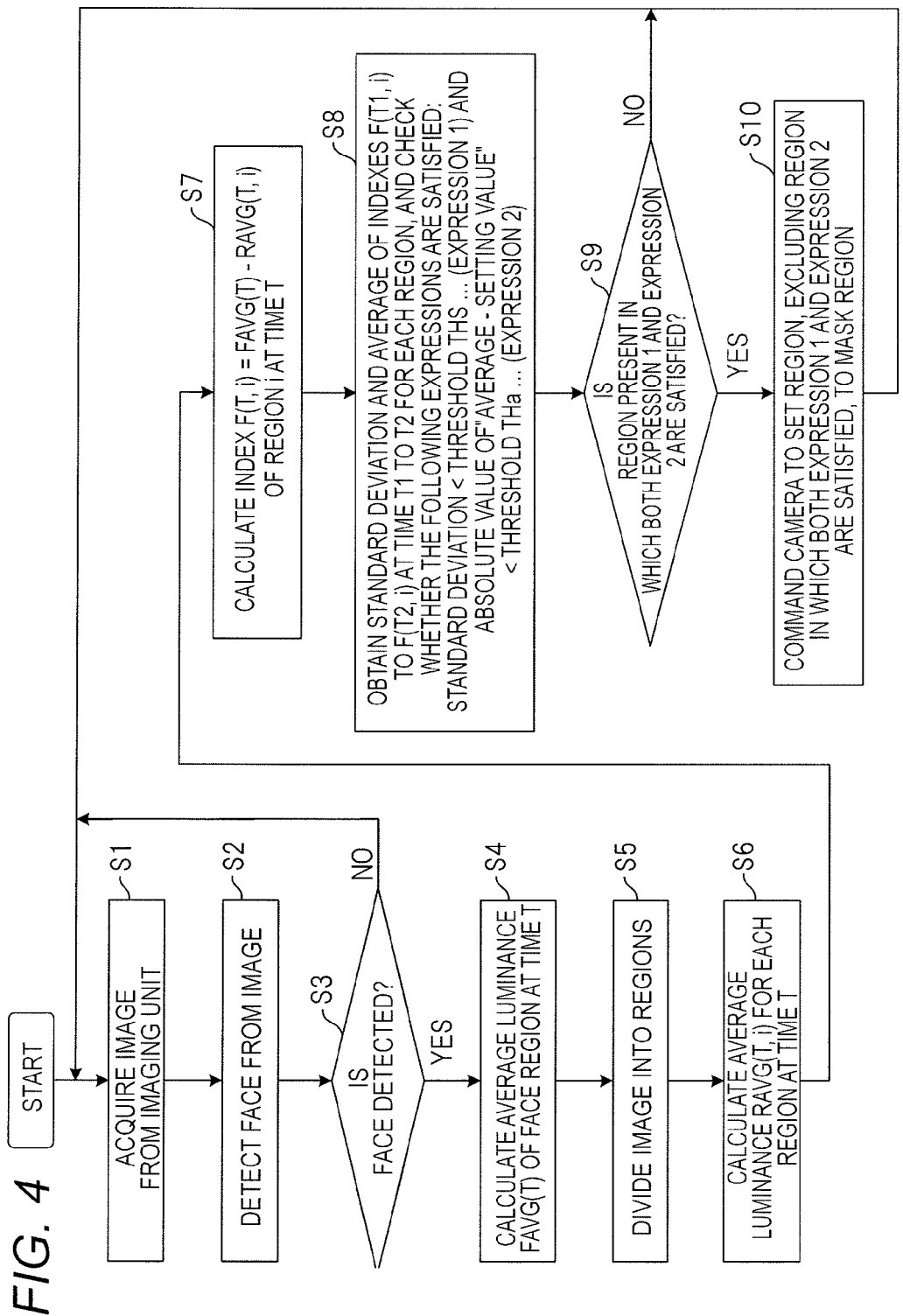
FIG. 4 is a flowchart illustrating an exposure control process of the imaging device of FIG. 1.

FIG. 4 is a flowchart illustrating an exposure control process of the imaging device 1 according to Embodiment 1. In the drawing, the face detection unit 32 first acquires an image from the imaging unit 21 of the camera 2 (step S1), and detects a person's face from the acquired image (step S2). Next, whether a face can be detected is determined (step S3). When a face cannot be detected (that is, when the determination result of step S3 is "No"), the flow returns to step S1, and the processes of steps S1 and S2 are performed again. On the other hand, when a face can be detected (that is, when the determination result of step S3 is "Yes"), the luminance calculation unit 34 calculates average luminance FAVG(T) of a face region at time T (step S4). After the luminance calculation unit 34 calculates the average luminance FAVG(T), the region division unit 33 divides an image, which is simultaneously acquired in the face detection unit 32, into regions (step S5). The image is divided into, for example, 8×6 blocks. After the region division unit 33 divides the image into regions, the luminance calculation unit 34 calculates average luminance RAVG(T, i) for each region at time T (step S6). Here, "T" refers to a time, and "i" refers to an i-th region.

After the luminance calculation unit 34 obtains the average luminance RAVG(T, i) for each region at time T, the diaphragm adjustment information calculation unit 35 calculates index F(T, i)=FAVG(T)−RAVG(T, i) of a region i at time T (step S7). That is, the luminance calculation unit 34 calculates a difference between the average luminance FAVG(T) of the face region at time T and the average luminance RAVG(T, i) of the region i. After the index F(T, i) of the region i at time T is calculated, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S8). Here, the setting value refers to a parameter (for example, "0") which is set in advance.

The diaphragm adjustment information calculation unit 35 determines whether a region in which both Expression 1 and Expression 2 are satisfied is present (step S9). When it is determined that the region in which both Expression 1 and Expression 2 are satisfied is not present (that is, the determination result of step S9 is "No"), the flow returns to step S1, and the processes of step S1 to step S8 are performed again. On the other hand, when it is determined that the region in which both Expression 1 and Expression 2 are satisfied is present (that is, when the determination result of step S9 is "Yes"), the camera 2 is commanded to set a region, excluding the region (non-mask region, that is, photometric region) in which both Expression 1 and Expression 2 are satisfied, to a mask region (step S10). That is, diaphragm adjustment information including a mask region setting command and the like is output to the diaphragm adjustment unit 22 of the camera 2. After such a process is performed, the flow returns to step S1.

In this manner, according to the imaging device 1 of Embodiment 1, face detection is performed from an image acquired from the imaging unit 21 and the image is divided into regions. The average luminance FAVG(T) of the face region at time T and the average luminance RAVG(T, i) for each region at time T are calculated, and then the index F(T, i) of the region i at time T is calculated. Further, a standard deviation and an average of the indexes F(T1, i) to F(T2, i) at time T1 to T2 are obtained for each region. When a region in which standard deviation<threshold THS . . . (Expression 1) and the absolute value of "average−setting value"<threshold THa . . . (Expression 2) are established is present, a region excluding the above region is set to a mask region, and thus a non-mask region is set to a diaphragm adjustment region. Therefore, appropriate diaphragm adjustment can be performed even when a face is not imaged for a long period of time or the brightness of the face is different depending on a period of time.

Meanwhile, in Embodiment 1, the face detection unit 32 is provided to the recorder 3 side, but may be provided to the camera 2 side.

Embodiment 2

Figure 5:
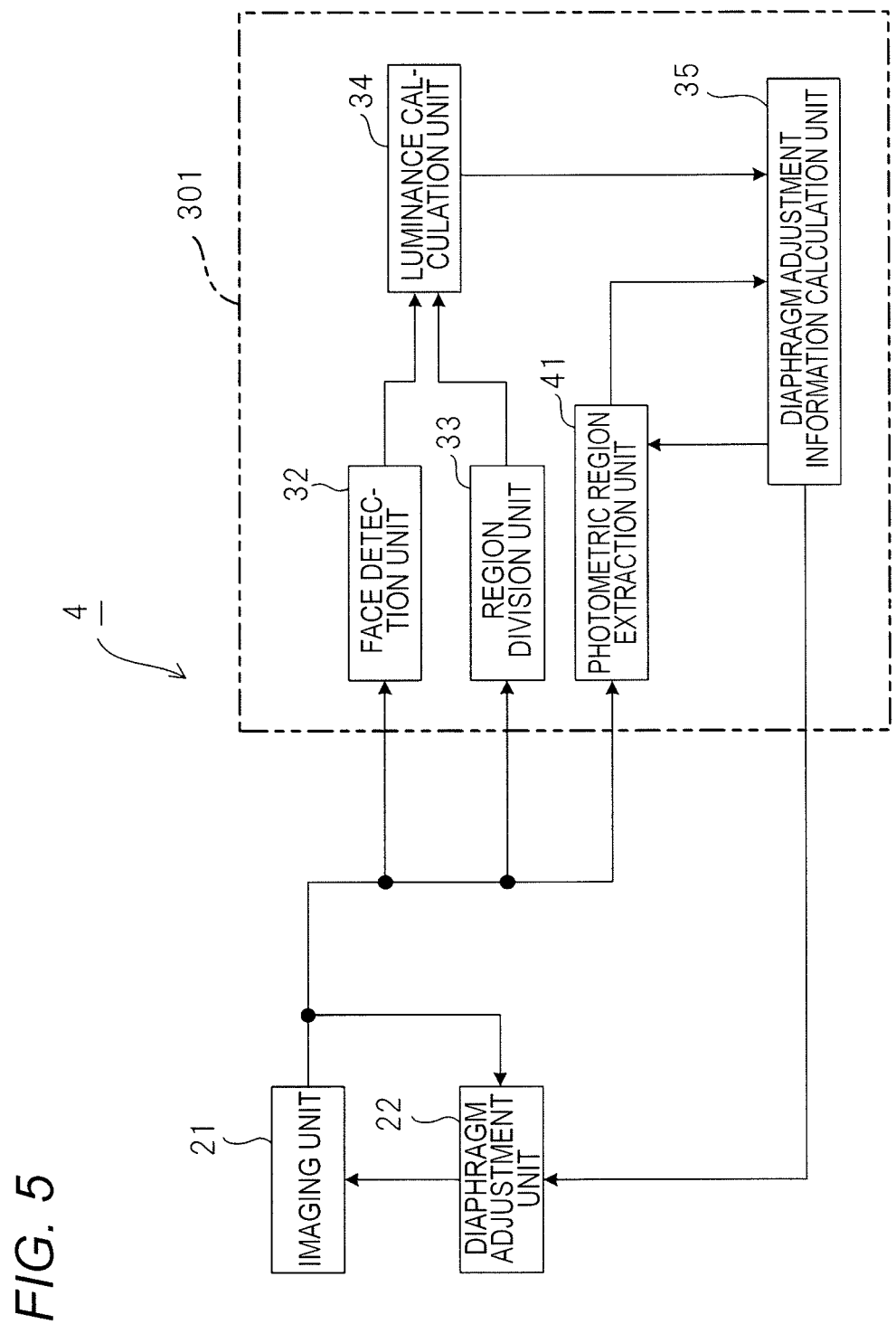
FIG. 5 is a block diagram illustrating a schematic configuration of an imaging device according to Embodiment 2 of the present invention.

FIG. 5 is a block diagram illustrating a schematic configuration of an imaging device according to Embodiment 2 of the present invention. Meanwhile, in the drawing, components common to those in FIG. 1 mentioned above are denoted by the same reference numerals and signs. An imaging device 4 according to Embodiment 2 is configured such that each unit of the recorder 3 of the device 1 is added to the camera 2 of the imaging device 1 according to Embodiment 1 mentioned above, and a photometric region extraction unit 41 which is new means is provided therein. Meanwhile, the face detection unit 32, the region division unit 33, the luminance calculation unit 34 and the diaphragm adjustment information calculation unit 35 which constitute the recorder 3, and the photometric region extraction unit 41 constitute an exposure control device 301.

The face detection unit 32 acquires an image from the imaging unit 21, and detects a region (object region) of a person's face from the acquired image. The region division unit 33 acquires an image from the imaging unit 21, and divides an imaging region of the acquired image into, for example, 8×6 blocks. The luminance calculation unit 34 calculates the luminance of the person's face detected by the face detection unit 32 and the luminance of each divided region obtained by dividing by the region division unit 33. The photometric region extraction unit 41 acquires an image from the imaging unit 21, and checks the luminance of a photometric region in the acquired image. The photometric region in the image is specified by the diaphragm adjustment information calculation unit 35. The diaphragm adjustment information calculation unit 35 obtains a divided region having a difference between the luminance of the person's face and the luminance of the divided region which is larger than a predetermined value, calculates a region excluding the divided region having a large difference between the luminances as a diaphragm adjustment region of the imaging unit 21, sets the calculated diaphragm adjustment region to a photometric region, and outputs the set photometric region to the photometric region extraction unit 41. The diaphragm adjustment information calculation unit 35 acquires the luminance of the photometric region in the image checked by the photometric region extraction unit 41, and outputs diaphragm adjustment information including a command to stop down a diaphragm when the luminance is larger than a setting value (target luminance set in advance) and a command to open the diaphragm when the luminance is smaller than that, to the diaphragm adjustment unit 22.

Next, operations of the imaging device 4 according to Embodiment 2 will be described.

Figure 6:
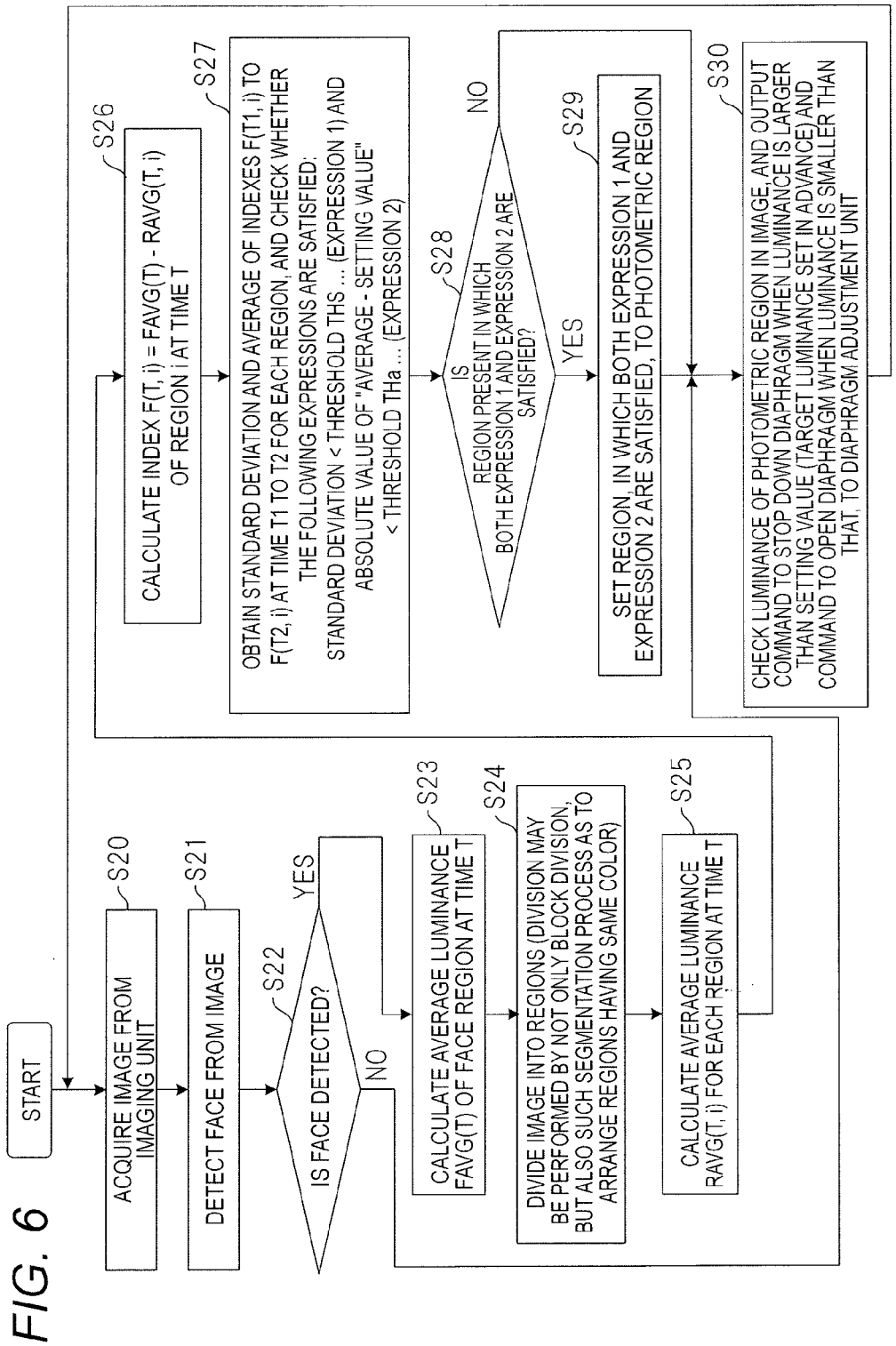
FIG. 6 is a flowchart illustrating an exposure control process of the imaging device of FIG. 5.

FIG. 6 is a flowchart illustrating an exposure control process of the imaging device 4 according to Embodiment 2. In the drawing, the face detection unit 32 first acquires an image from the imaging unit 21 (step S20), and detects a person's face from the acquired image (step S21). Whether a face can be detected is then determined (step S22). When a face can be detected (that is, when the determination result of step S22 is "Yes"), the luminance calculation unit 34 calculates average luminance FAVG(T) of a face region at time T (step S23). After the luminance calculation unit 34 calculates the average luminance FAVG(T), the region division unit 33 divides an image, which is simultaneously acquired in the face detection unit 32, into regions (step S24). Meanwhile, the division of the image can be performed by not only block division, but also such a segmentation process as to arrange regions having the same color. After the region division unit 33 divides the image into regions, the luminance calculation unit 34 calculates average luminance RAVG(T, i) for each region at time T (step S25). Here, "T" refers to a time, and "i" refers to an i-th region.

After the luminance calculation unit 34 obtains the average luminance RAVG(T, i) for each region at time T, the diaphragm adjustment information calculation unit 35 calculates index F(T, FAVG(T)−RAVG(T, i)) of a region i at time T (step S26). After the diaphragm adjustment information calculation unit 35 calculates the index F(T, i) of the region i at time T, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S27). Here, the setting value refers to a parameter (for example, "0") which is set in advance.

The diaphragm adjustment information calculation unit 35 determines whether a region in which both Expression 1 and Expression 2 are satisfied is present (step S28). When it is determined that the region in which both Expression 1 and Expression 2 are satisfied is present (that is, when the determination result of step S28 is "Yes"), the region in which both Expression 1 and Expression 2 are satisfied is set to a photometric region (step S29). The set photometric region is specified to the photometric region extraction unit 41. The photometric region extraction unit 41 checks the luminance of the photometric region specified by the diaphragm adjustment information calculation unit 35, and the result is output to the diaphragm adjustment information calculation unit 35. The diaphragm adjustment information calculation unit 35 outputs a command to stop down a diaphragm when the luminance of the photometric region in the image is larger than a setting value (target luminance set in advance) and a command to open the diaphragm when the luminance is smaller than that, to the diaphragm adjustment unit 22 (step S30). On the other hand, when it is determined in the determination of step S28 that the region in which both Expression 1 and Expression 2 are satisfied is not present (that is, the determination result of step S28 is "No"), the diaphragm adjustment information calculation unit 35 does not set the photometric region, and performs the process of step S30. After the process of step S30 is performed, the flow returns to the process of step S20. In addition, when it is determined in the determination of step S22 that a face is not detected (that is, when the determination result of step S22 is "No"), the process of step S30 is performed directly.

In this manner, according to the imaging device 4 of Embodiment 2, face detection is performed from an image acquired from the imaging unit 21 and the image is divided into regions. The average luminance FAVG(T) of the face region at time T and the average luminance RAVG(T, i) for each region at time T are calculated, and then the index F(T, i) of the region i at time T is calculated. Further, a standard deviation and an average of the indexes F(T1, i) to F(T2, i) at time T1 to T2 are obtained for each region. When a region in which standard deviation<threshold THS . . . (Expression 1) and the absolute value of "average−setting value"<threshold THa . . . (Expression 2) are established is present, the region is set to a photometric region, and the luminance of the set photometric region is checked. The diaphragm is stopped down when the luminance is larger than target luminance which is set in advance, and the diaphragm is opened when the luminance is smaller than that. Therefore, appropriate diaphragm adjustment can be performed even when a face is not imaged for a long period of time or the brightness of the face is different depending on a period of time.

Embodiment 3

Figure 7:
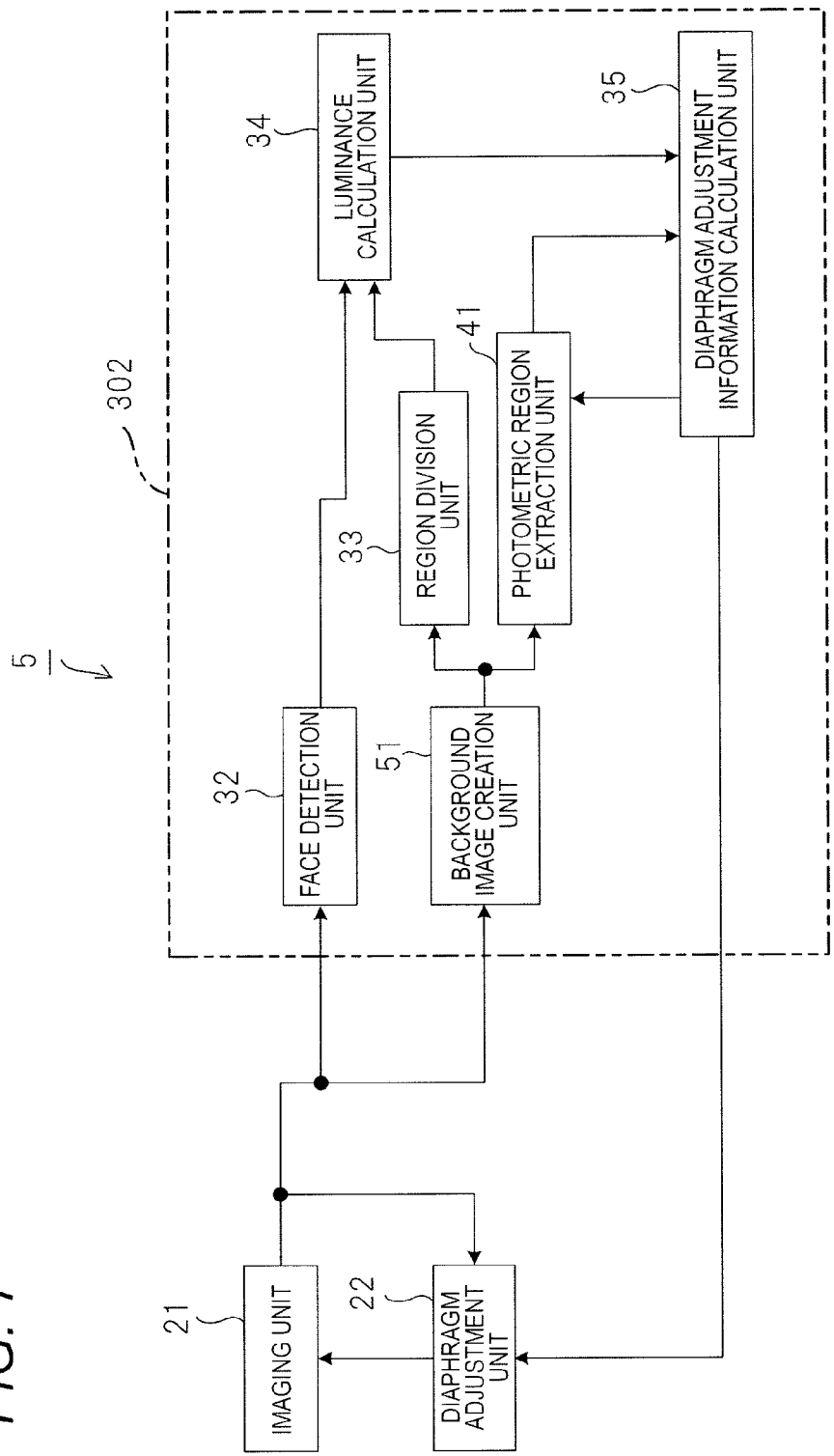
FIG. 7 is a block diagram illustrating a schematic configuration of an imaging device according to Embodiment 3 of the present invention.

FIG. 7 is a block diagram illustrating a schematic configuration of an imaging device according to Embodiment 3 of the present invention. In the drawing, components common to those in FIGS. 1 and 5 mentioned above are denoted by the same reference numerals and signs. An imaging device 5 according to Embodiment 3 is configured such that a background image creation unit 51 that creates a background image is provided to the imaging device 4 according to Embodiment 2 mentioned above, the background image is created by the background image creation unit 51, a photometric region is obtained by setting the "luminance of the region i of the background image—the luminance of the face region" at time T to the index F(T, and such that diaphragm adjustment is performed so that the luminance of the photometric region of the obtained background image becomes predetermined luminance. The background image creation unit 51 creates the background image on the basis of the image acquired from the imaging unit 21 as described above. Meanwhile, the face detection unit 32, the region division unit 33, the luminance calculation unit 34, the diaphragm adjustment information calculation unit 35, the photometric region extraction unit 41 and the background image creation unit 51 constitute an exposure control device 302.

Figure 8:
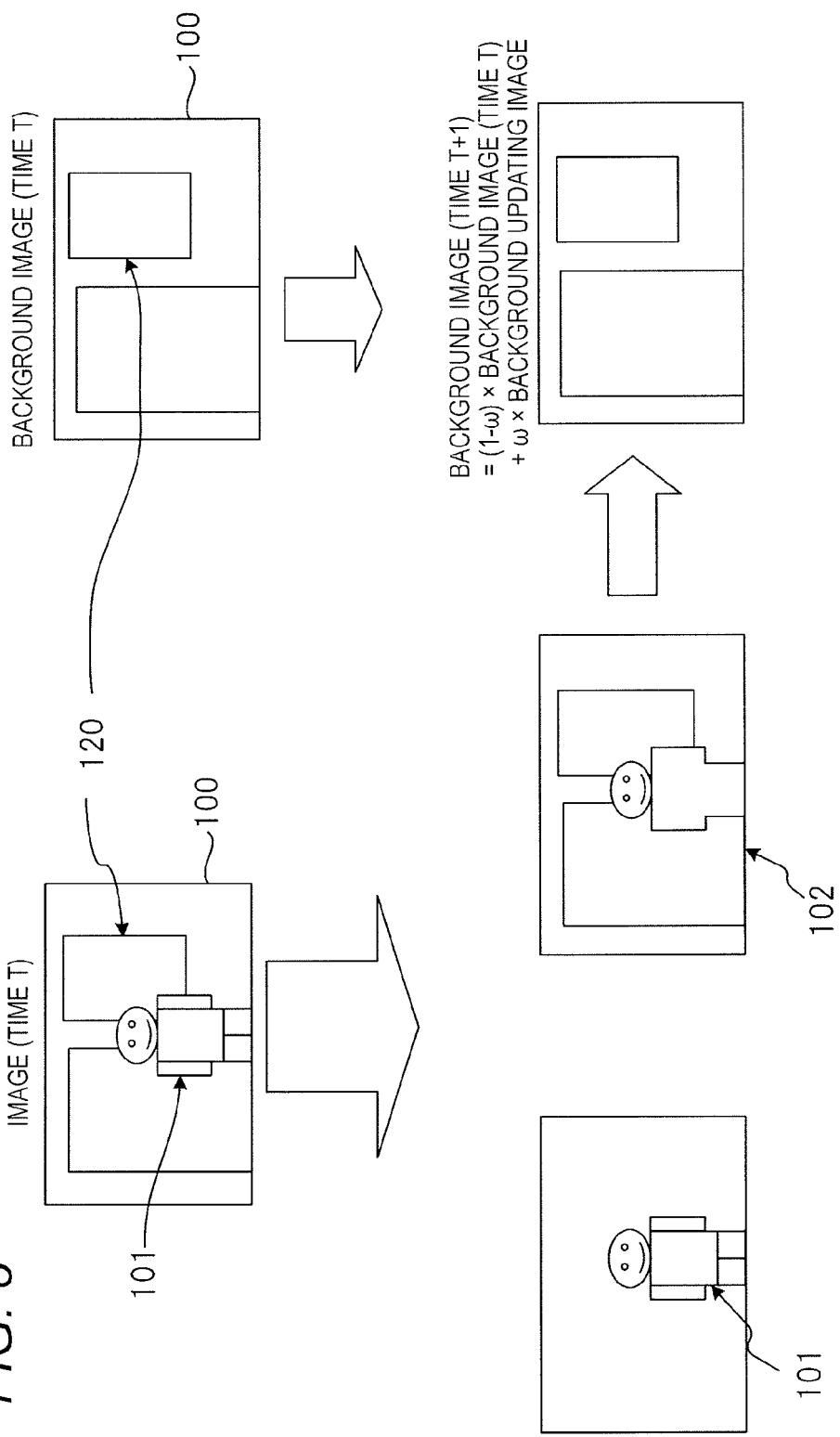
FIG. 8 is a diagram schematically illustrating a method of creating a background image in the imaging device of FIG. 7.

FIG. 8 is a diagram schematically illustrating a method of creating a background image in the imaging device 5 according to Embodiment 3. In the drawing, the image (image at time T) 100 acquired from the imaging unit 21 is divided into a region (motion region) 101 of a moving object and other regions using motion detection. The motion region 101 in the image 100 becomes a foreground image, and a region excluding the motion region 101 which is a foreground image becomes a background updating image 102. A background image at time T+1 is obtained in (1+ω)×background image (time T)+ω×background updating image. Here, ω is a parameter which is set in advance.

Since the background image has no fluctuation in brightness due to the passage of a person or a moving object within a region to photographed, a region close to the brightness of a person's face is estimated within the background image, and the region is set to a photometric region. The region 120 in the background image of FIG. 8 is set to a diaphragm adjustment region, that is, a photometric region. Diaphragm adjustment is performed so as to have predetermined brightness using this photometric region, and thus appropriate diaphragm adjustment can be performed even when a face is not imaged for a long period of time or the brightness of the face is different depending on a period of time.

Returning to FIG. 7, the region division unit 33 acquires a background image created by the background image creation unit 51, and divides an imaging region of the acquired background image. The luminance calculation unit 34 calculates the luminance of the region of the person's face detected by the face detection unit 32 and the luminance of the divided region obtained by dividing by the region division unit 33. The photometric region extraction unit 41 acquires the background image created by the background image creation unit 51, and checks the luminance of the photometric region in the acquired background image. The photometric region in the image is specified by the diaphragm adjustment information calculation unit 35. The diaphragm adjustment information calculation unit 35 obtains a divided region having a difference between the luminance of the person's face and the luminance of the divided region which is larger than a predetermined value, calculates a region excluding the divided region having a large difference between the luminances as a diaphragm adjustment region of the imaging unit 21, sets the calculated diaphragm adjustment region to a photometric region, and outputs the set photometric region to the photometric region extraction unit 41. The luminance of the photometric region in the background image checked by the photometric region extraction unit 41 is then acquired. A command to stop down a diaphragm when the acquired luminance is larger than a setting value (target luminance set in advance) and a command to open the diaphragm when the luminance is smaller than that are output to the diaphragm adjustment unit 22.

Next, operations of the imaging device 5 according to Embodiment 3 will be described.

Figure 9:
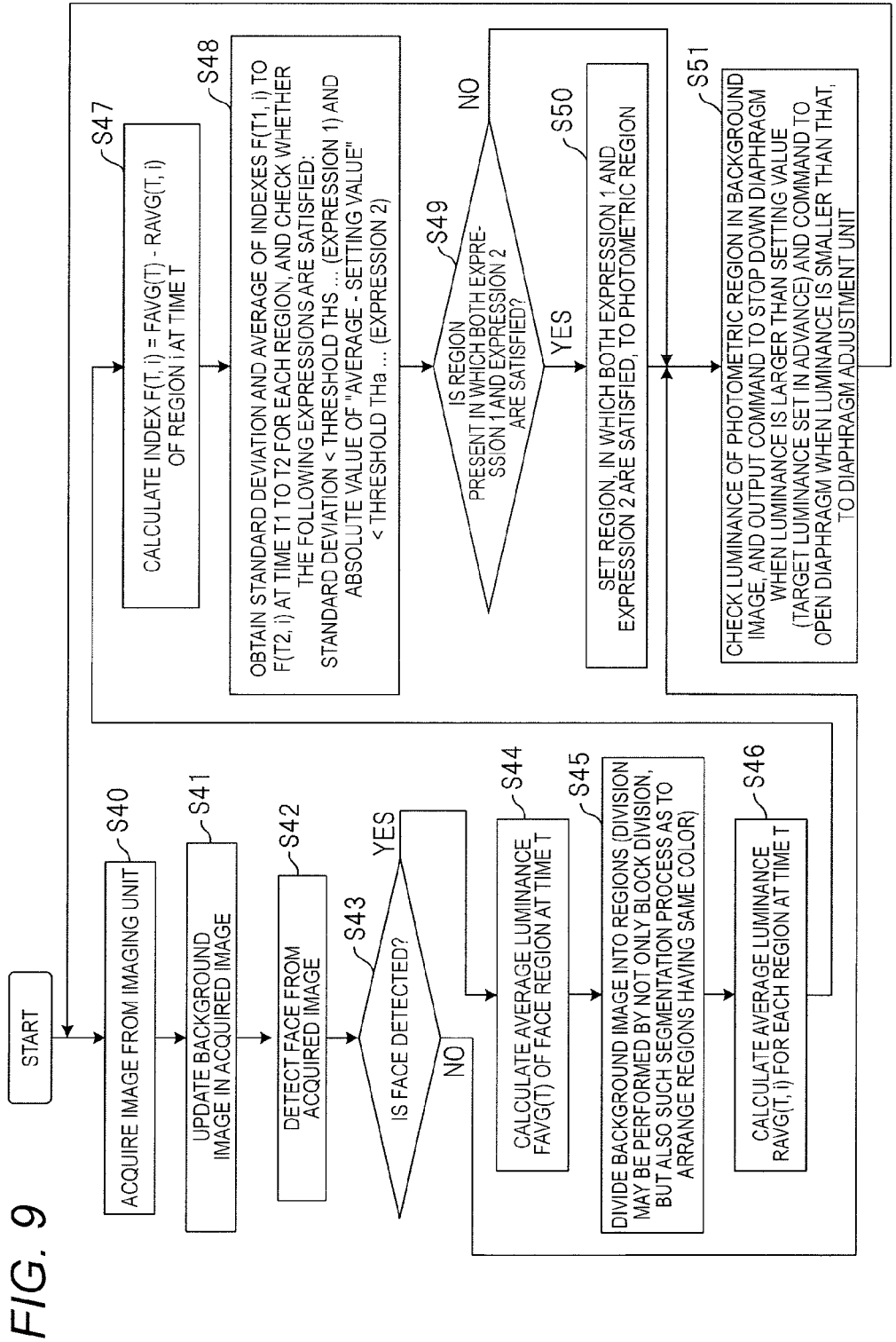
FIG. 9 is a flowchart illustrating an exposure control process of the imaging device of FIG. 7.

FIG. 9 is a flowchart illustrating an exposure control process of the imaging device 5 according to Embodiment 3. In the drawing, the background image creation unit 51 first acquires an image from the imaging unit 21 (step S40), and updates the background image in the acquired image (step S41). After the background image creation unit 51 updates the background image, the face detection unit 32 detects a person's face from the acquired image (step S42). Whether a face can be detected is then determined (step S43). When a face can be detected (that is, the determination result of step S43 is "Yes"), the luminance calculation unit 34 calculates average luminance FAVG(T) of a face region at time T (step S44). After the luminance calculation unit 34 calculates the average luminance FAVG(T), the region division unit 33 acquires the background image created by the background image creation unit 51, and divides the background image into regions (step S45). Meanwhile, the division of the image can be performed by not only block division, but also such a segmentation process as to arrange regions having the same color.

After the region division unit 33 divides the background image into regions, the luminance calculation unit 34 calculates average luminance RAVG(T, i) for each region at time T (step S46). Here, "T" refers to a time, and "i" refers to an i-th region. After the luminance calculation unit 34 obtains the average luminance RAVG(T, i) for each region at time T, the diaphragm adjustment information calculation unit 35 calculates index F(T, i)=FAVG(T)−RAVG(T, i) of a region i at time T (step S47). After the diaphragm adjustment information calculation unit 35 calculates the index F(T, i) of the region i at time T, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S48). Here, the setting value refers to a parameter (for example, "0") which is set in advance.

The diaphragm adjustment information calculation unit 35 determines whether a region in which both Expression 1 and Expression 2 are satisfied is present (step S49). When it is determined that the region in which both Expression 1 and Expression 2 are satisfied is present (that is, when the determination result of step S49 is "Yes"), the region in which both Expression 1 and Expression 2 are satisfied is set to a photometric region (step S50). The set photometric region is then specified to the photometric region extraction unit 41. The photometric region extraction unit 41 checks the luminance of the photometric region in the background image specified by the diaphragm adjustment information calculation unit 35, and the result is output to the diaphragm adjustment information calculation unit 35. The diaphragm adjustment information calculation unit 35 outputs a command to stop down a diaphragm when the luminance of the photometric region in the background image is larger than a setting value (target luminance set in advance) and a command to open the diaphragm when the luminance is smaller than that, to the diaphragm adjustment unit 22 (step S51). On the other hand, when it is determined in the determination of step S49 that the region in which both Expression 1 and Expression 2 are satisfied is not present (that is, the determination result of step S49 is "No"), the diaphragm adjustment information calculation unit 35 does not set the photometric region, and performs the process of step S51. After the process of step S51 is performed, the flow returns to the process of step S40. In addition, when it is determined in the determination of step S43 that a face is not detected (that is, when the determination result of step S43 is "No"), the process of step S51 is performed directly.

In this manner, according to the imaging device 5 of Embodiment 3, an image is acquired from the imaging unit 21 to perform face detection and the background image is divided into regions. The average luminance FAVG(T) of the face region at time T and the average luminance RAVG (T, for each region at time T are calculated, and then the index F(T, i) of the region i at time T is calculated. Further, a standard deviation and an average of the indexes F(T1, i) to F(T2, i) at time T1 to T2 are obtained for each region. When a region in which standard deviation<threshold THS . . . (Expression 1) and the absolute value of "average−setting value"<threshold THa . . . (Expression 2) are established is present, the region is set to a photometric region, and the luminance of the set photometric region is checked. The diaphragm is stopped down when the luminance is larger than target luminance which is set in advance, and the diaphragm is opened when the luminance is smaller than that. Therefore, appropriate diaphragm adjustment can be performed even when a face is not imaged for a long period of time or the brightness of the face is different depending on a period of time.

Embodiment 4

Figure 10:
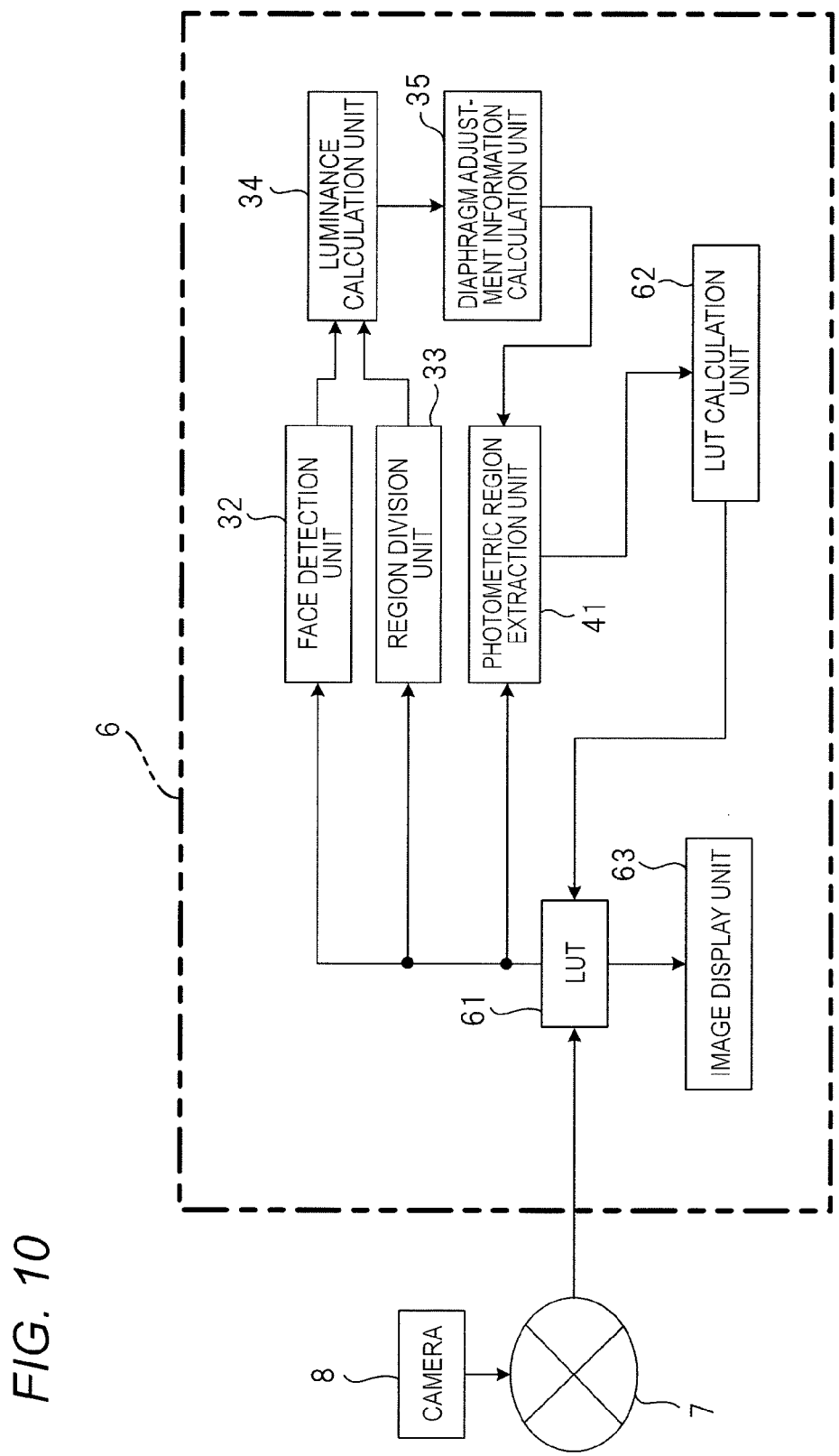
FIG. 10 is a block diagram illustrating a schematic configuration of an image display device according to Embodiment 4 of the present invention.

FIG. 10 is a block diagram illustrating a schematic configuration of an image display device according to Embodiment 4 of the present invention. In the drawing, components common to those in FIGS. 1 and 5 mentioned above are denoted by the same reference numerals and signs. An image display device 6 according to Embodiment 4 is configured to acquire an image from a camera 8 connected to a network 7 and displays the image on the image display device 6, and includes an LUT (look-up table) 61, an LUT calculation unit 62 and an image display unit 63, in addition to the face detection unit 32, the region division unit 33, the luminance calculation unit 34, the diaphragm adjustment information calculation unit 35 and the photometric region extraction unit 41 which are common to the imaging device 4 according to Embodiment 2 and the imaging device 5 according to Embodiment 3 as mentioned above. However, the image display device 6 according to Embodiment 4 is configured not to perform diaphragm adjustment in the imaging devices 1, 4, and 5 according to Embodiments 1 to 3 mentioned above, but to display an image easily to be seen by adjusting the brightness of the image which is input to the image display device 6.

The face detection unit 32 acquires an image transmitted from the camera 8 through the network 7, and detects a face from the acquired image. The region division unit 33 acquires the image transmitted from the camera 8 through the network 7, and divides an imaging region of the acquired image. The luminance calculation unit 34 calculates the luminance of a region of a person's face detected by the face detection unit 32 and the luminance of a divided region obtained by dividing by the region division unit 33. The photometric region extraction unit 41 acquires the image transmitted from the camera 8 through the network 7, and checks the average luminance of the photometric region in the acquired image. The photometric region in the image is specified by the diaphragm adjustment information calculation unit 35.

The diaphragm adjustment information calculation unit 35 obtains a divided region having a difference between the luminance of the person's face and the luminance of the divided region which is larger than a predetermined value, calculates a region excluding the divided region having a large difference between the luminances as a diaphragm adjustment region, sets the calculated diaphragm adjustment region to a photometric region, and outputs the set photometric region to the photometric region extraction unit 41. The LUT calculation unit 62 acquires the average luminance of the photometric region which is output from the photometric region extraction unit 41 to calculate LUT data, and outputs the result to the LUT 61. The LUT 61 has a data conversion table (not shown), and converts input data using this data conversion table to output the converted data. The image display unit 63 displays an image of which the brightness is adjusted by the LUT 61.

Figure 11:
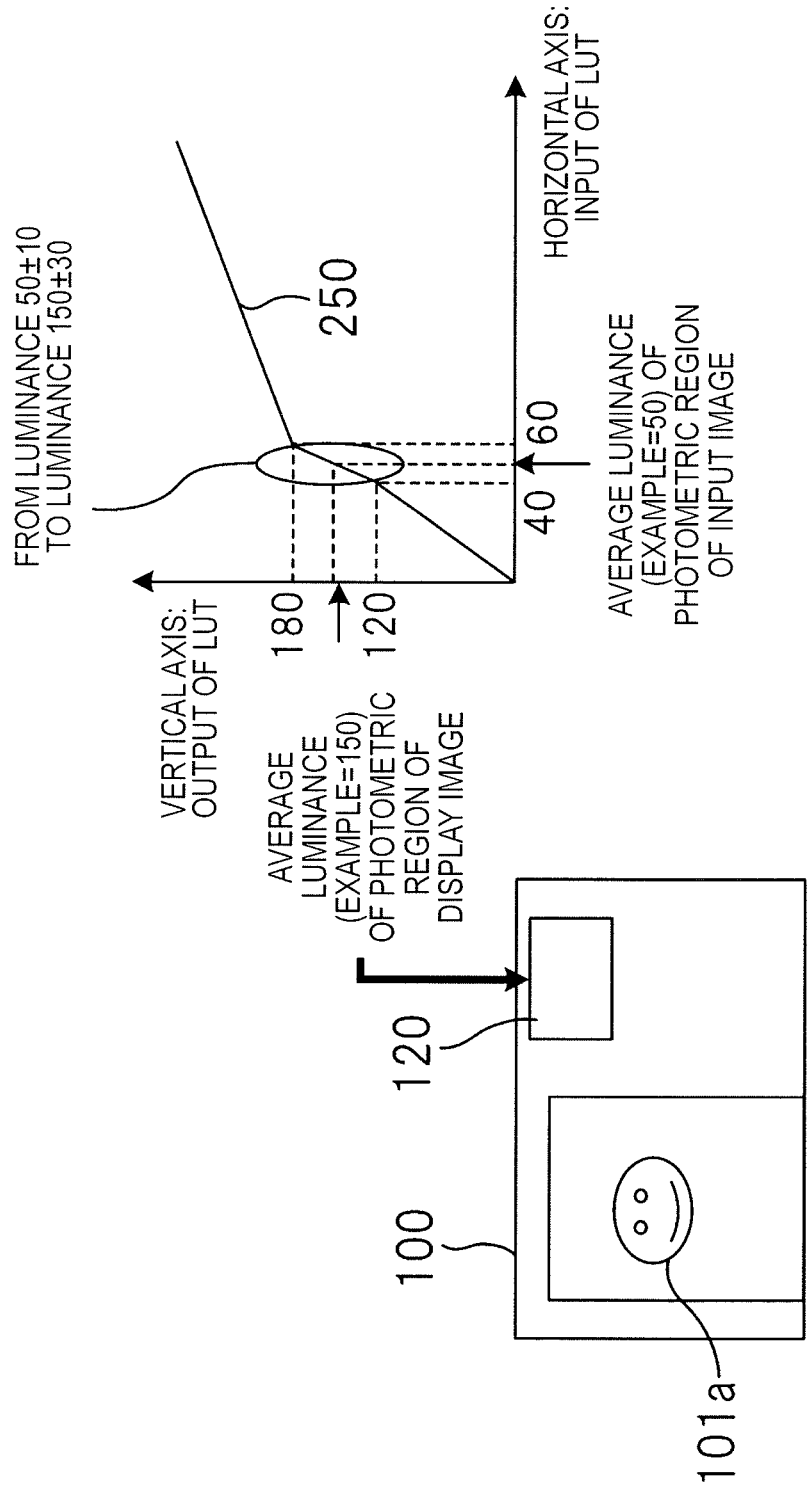
FIG. 11 is a diagram graphically illustrating an example of LUT data of the image display device of FIG. 10.
Figure 12:
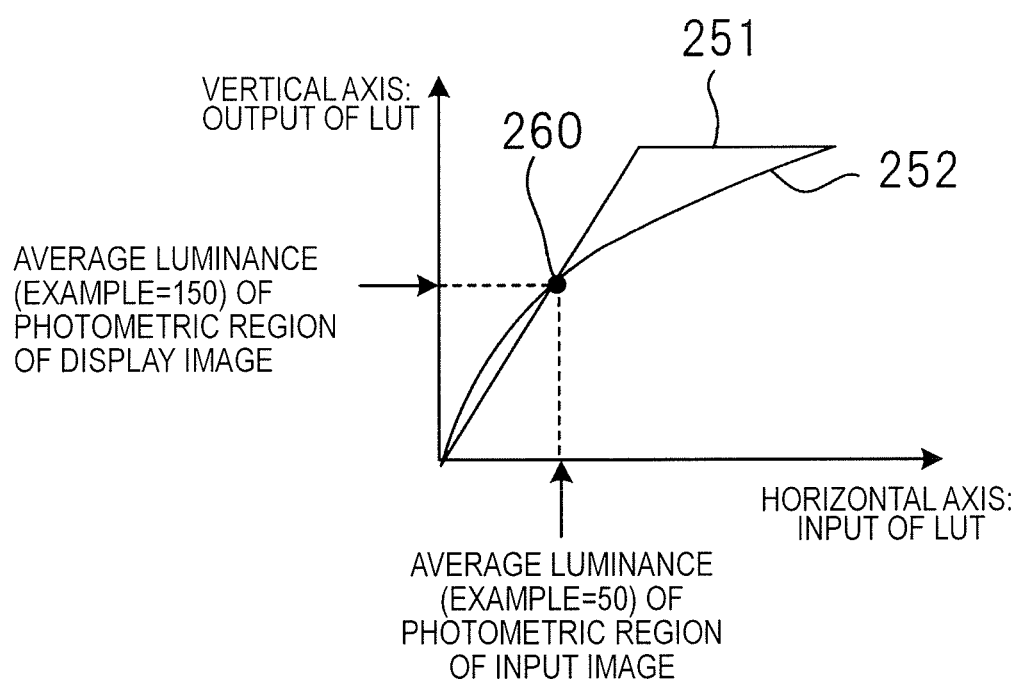
FIG. 12 is a diagram graphically illustrating another example of the LUT data of the image display device of FIG. 10.

FIG. 11 is a diagram graphically illustrating an example of LUT data. In the drawing, a horizontal axis represents an input of the LUT 61, and a vertical axis represents an output of the LUT 61. This LUT data 250 is data in which the vicinity of the average luminance of the photometric region is converted into a predetermined range (that is, a dynamic range in the vicinity of the photometric region is expand). For example, conversion from the average luminance 50±10 of the photometric region of an input image to the average luminance 150±30 of the photometric region 120 of the image 100 is performed. A person's face 101a in the image 100 has appropriate brightness by using this LUT data. Meanwhile, the LUT data is not limited to that as shown in FIG. 11, but may pass an original point and a point 260, for example, as shown in FIG. 12, and may have a polygonal line 251 clipped with a maximum output or a curve 252 passing the original point and the point 260.

Next, operations of the image display device 6 according to Embodiment 4 will be described.

Figure 13:
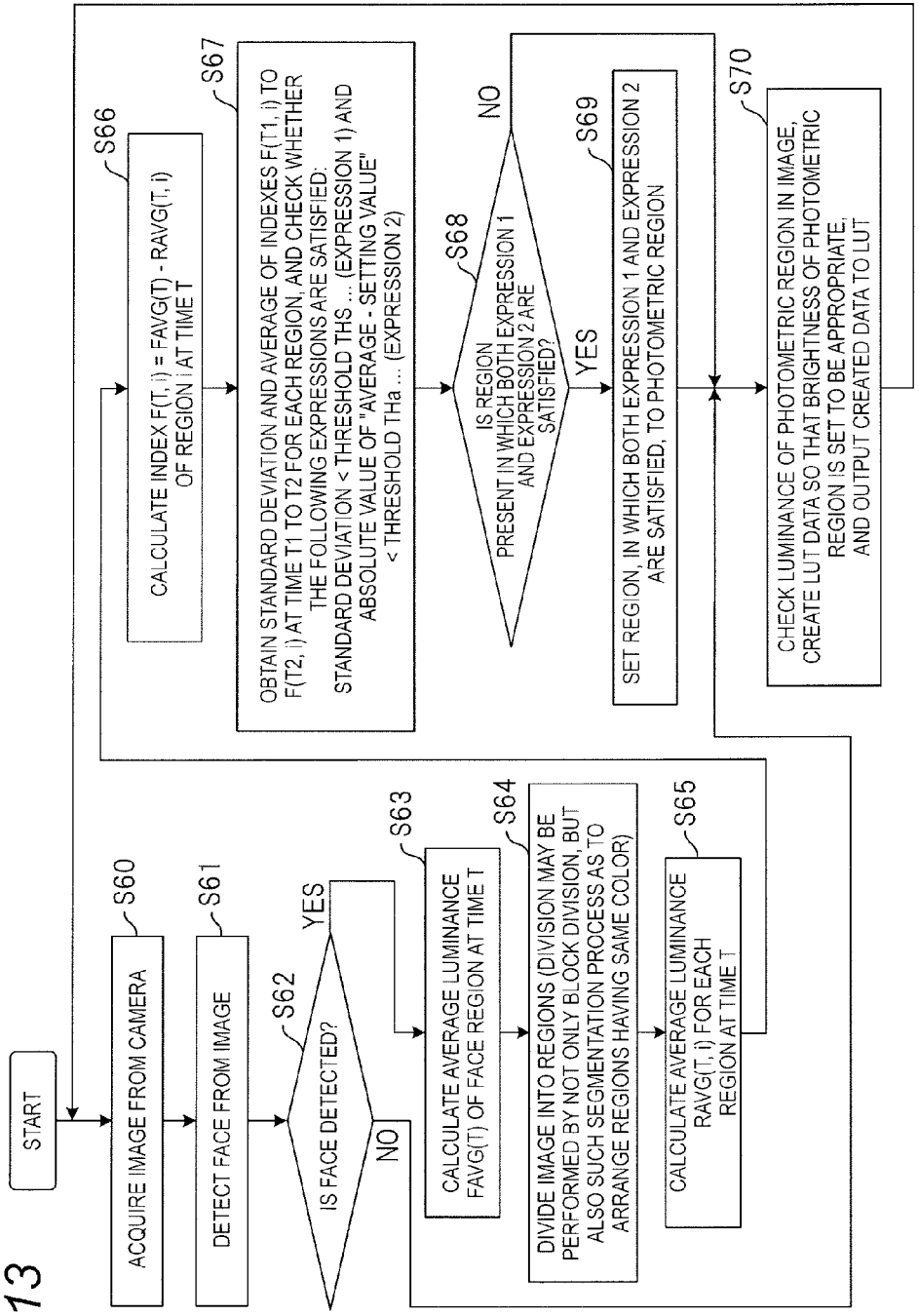
FIG. 13 is a flowchart illustrating an image display process of the image display device of FIG. 10.

FIG. 13 is a flowchart illustrating an image display process of the image display device 6 according to Embodiment 4. In the drawing, the face detection unit 32 first acquires the image transmitted from the camera 8 through the network 7 (step S60), and detects the person's face from the acquired image (step S61). Whether a face can be detected is then determined (step S62). When a face can be detected (that is, when the determination result of step S62 is "Yes"), the luminance calculation unit 34 calculates average luminance FAVG(T) of a face region at time T (step S63). After the luminance calculation unit 34 calculates the average luminance FAVG(T), the region division unit 33 divides an image, which is simultaneously acquired in the face detection unit 32, into regions (step S64). Meanwhile, the division of the image can be performed by not only block division, but also such a segmentation process as to arrange regions having the same color.

After the region division unit 33 divides the image into regions, the luminance calculation unit 34 calculates average luminance RAVG(T, i) for each region at time T (step S65). Here, "T" refers to a time, and "i" refers to an i-th region. After the luminance calculation unit 34 obtains the average luminance RAVG(T, i) for each region at time T, the diaphragm adjustment information calculation unit 35 calculates index F(T, i)=FAVG(T)−RAVG(T, i) of a region i at time T (step S66). After the diaphragm adjustment information calculation unit 35 calculates the index F(T, i) of the region i at time T, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S67). Here, the setting value refers to a parameter (for example, "0") which is set in advance.

The diaphragm adjustment information calculation unit 35 determines whether a region in which both Expression 1 and Expression 2 are satisfied is present (step S68). When it is determined that the region in which both Expression 1 and Expression 2 are satisfied is present (that is, when the determination result of step S68 is "Yes"), the region in which both Expression 1 and Expression 2 are satisfied is set to a photometric region (step S69). The set photometric region is then specified to the photometric region extraction unit 41. The photometric region extraction unit 41 checks the average luminance of the photometric region in the image specified by the diaphragm adjustment information calculation unit 35, and the result is output to the LUT calculation unit 62. The LUT calculation unit 62 acquires the average luminance from the photometric region extraction unit 41, and creates LUT data so that the brightness of the photometric region is set to be appropriate and outputs the created data to the LUT 61 (step S70).

On the other hand, when it is determined in the determination of step S68 that the region in which both Expression 1 and Expression 2 are satisfied is not present (that is, when the determination result of step S68 is "No"), the diaphragm adjustment information calculation unit 35 does not set the photometric region, and performs the process of step S70. After the process of step 70 is performed, the flow returns to the process of step S60. In addition, when it is determined in the determination of step S62 that a face is not detected (that is, when the determination result of step S62 is "No"), the process of step S70 is performed directly.

In this manner, according to the image display device 6 of Embodiment 4, an image is acquired from the camera 8 connected to the network 7 to perform face detection and the image is divided into regions. The average luminance FAVG (T) of the face region at time T and the average luminance RAVG(T, i) for each region at time T are calculated, and then the index F(T, i) of the region i at time T is calculated. Further, a standard deviation and an average of the indexes F(T1, i) to F(T2, i) at time T1 to T2 are obtained for each region. When a region in which standard deviation<threshold THS . . . (Expression 1) and the absolute value of "average−setting value"<threshold THa of . . . (Expression 2) are established is present, the region is set to a photometric region, the luminance of the set photometric region is checked, and LUT data is created so that the brightness of the photometric region is set to be appropriate. Therefore, an image displayed on the image display unit 63 can be made visible.

Embodiment 5

Figure 14:
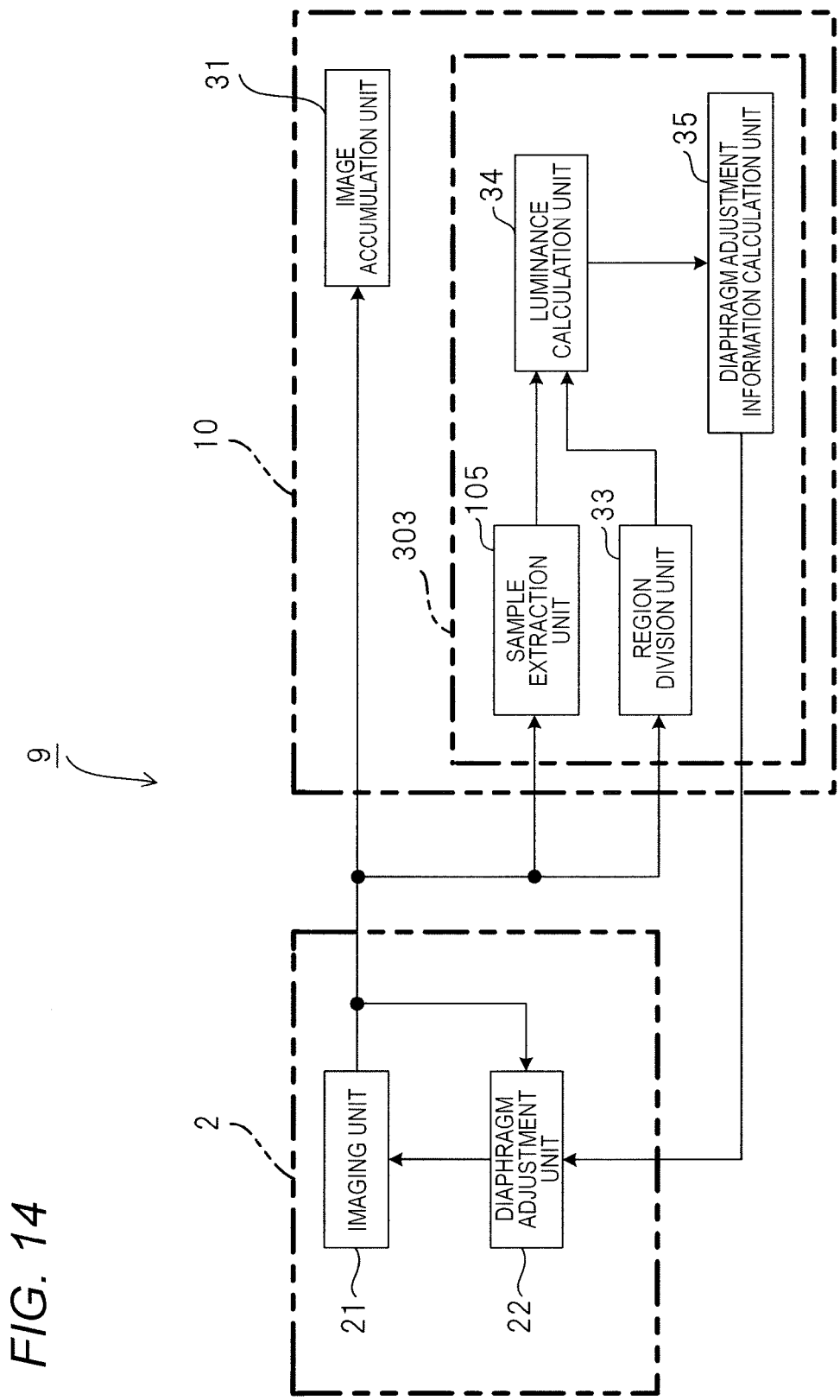
FIG. 14 is a block diagram illustrating a schematic configuration of an imaging device according to Embodiment 5 of the present invention.

FIG. 14 is a block diagram illustrating a schematic configuration of an imaging device according to Embodiment 5 of the present invention. In the drawing, components common to those in FIG. 1 mentioned above are denoted by the same reference numerals and signs. An imaging device 9 according to Embodiment 5 is configured such that the photometric region can be determined using a sample (for example, flesh-colored cushion) placed within the angle of view instead of the face region. Even when the frequency of entry of a person is relatively low by using the sample, or even in a case of the period of time in which the frequency of entry is low, it is possible to search for a region suitable for photometry. Meanwhile, the sample may be hung on an appropriate place, for example, in the morning, afternoon, and evening. In addition, when the present invention is used at the time of setting up a monitoring camera, the sample is kept in an appropriate place within a region to be monitored until the setup is terminated. In addition, since the sample is used to restrict the freedom of the layout of the region to be monitored (for example, layout of the store entrance), it is generally difficult to install the sample at all times. In the present invention, the sample may be occasionally installed on the basis of such a premise.

Figure 15:
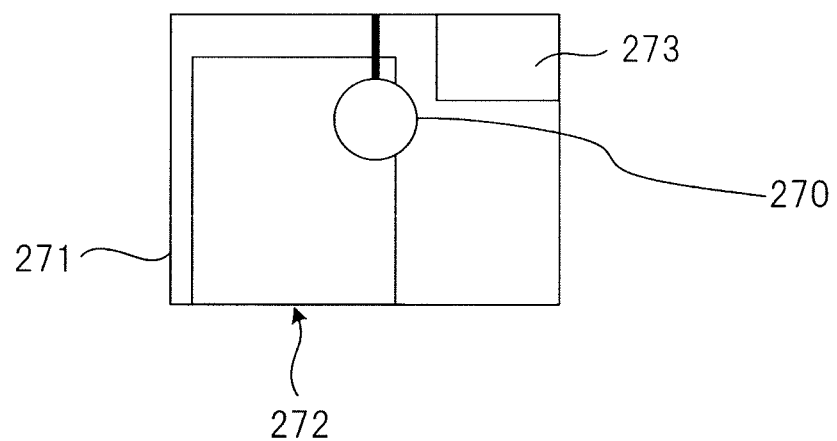
FIG. 15 is a diagram illustrating an installation example of a sample used in the imaging device of FIG. 14.

In FIG. 14, the imaging device 9 according to Embodiment 5 includes the camera 2 and a recorder (recording device) 10, similarly to the imaging device 1 according to Embodiment 1 mentioned above. The recorder 10 includes the image accumulation unit 31, and the region division unit 33, the luminance calculation unit 34, the diaphragm adjustment information calculation unit 35 and a sample extraction unit 105 which function as an exposure control device 303. The sample extraction unit 105 acquires an image from the camera 2, and detects a sample (object region) from the acquired image. FIG. 15 is a diagram illustrating a sample installation example. As shown in the drawing, a sample 270 is installed at an entrance 272 of a store 271.

Next, operations of the imaging device 9 according to Embodiment 5 will be described.

Figure 16:
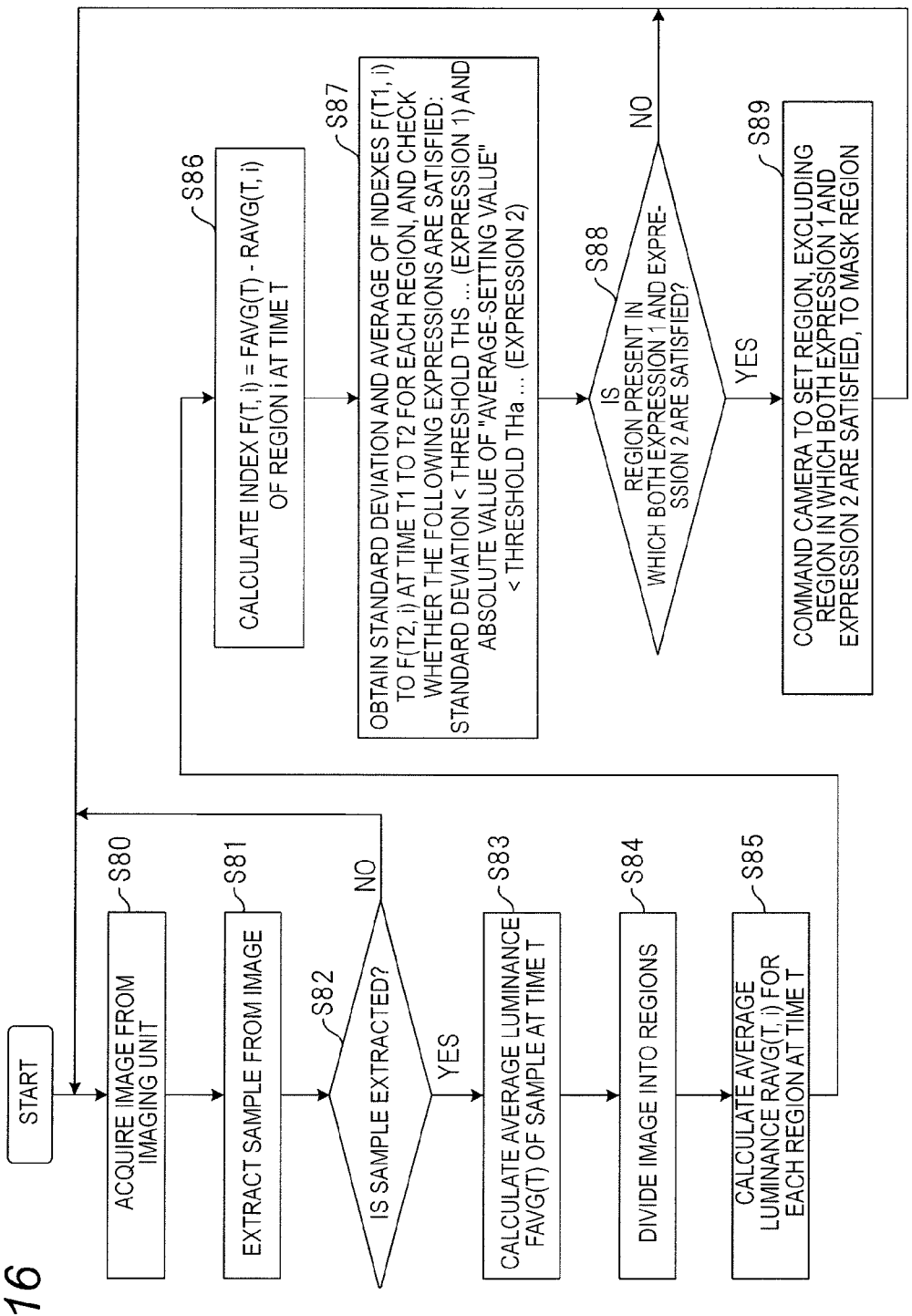
FIG. 16 is a flowchart illustrating an exposure control process of the imaging device of FIG. 14.

FIG. 16 is a flowchart illustrating an exposure control process of the imaging device 9 according to Embodiment 5. In the drawing, the sample extraction unit 105 first acquires an image from the imaging unit 21 of the camera 2 (step S80), and extracts a sample from the acquired image (step S81). Next, whether the sample can be extracted is determined (step S82). When the sample cannot be extracted (that is, when the determination result of step S82 is "No"), the flow returns to step S80, and the processes of steps S80 and S81 are performed again. On the other hand, when the sample can be extracted (that is, when the determination result of step S82 is "Yes"), the luminance calculation unit 34 calculates average luminance FAVG(T) of the sample at time T (step S83). After the luminance calculation unit 34 calculates the average luminance FAVG(T), the region division unit 33 divides an image, which is simultaneously acquired in the sample extraction unit 105, into regions (step S84). The image is divided into, for example, 8×6 blocks. After the region division unit 33 divides the image into regions, the luminance calculation unit 34 calculates average luminance RAVG(T, i) for each region at time T (step S85). Here, "T" refers to a time, and "i" refers to an i-th region.

After the luminance calculation unit 34 obtains the average luminance RAVG(T, i) for each region at time T, the diaphragm adjustment information calculation unit 35 calculates index F(T, i)=FAVG(T)−RAVG(T, i) of a region i at time T (step S86). That is, a difference between the average luminance FAVG(T) of a sample region and the average luminance RAVG(T, 1) of the region i at time T is calculated. After the index F(T, i) of the region i a time T is calculated, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S87). Here, the setting value refers to a parameter (for example, "0") which is set in advance.

The diaphragm adjustment information calculation unit 35 determines whether a region in which both Expression 1 and Expression 2 are satisfied is present (step S88). When it is determined that the region in which both Expression 1 and Expression 2 are satisfied is not present (that is, when the determination result of step S88 is "No"), the flow returns to step S80, and the processes of step S80 to step S88 are performed again. On the other hand, when it is determined that the region in which both Expression 1 and Expression 2 are satisfied is present (that is, when the determination result of step S88 is "Yes"), the camera 2 is commanded to set a region, excluding the region (non-mask region, that is, photometric region) in which both Expression 1 and Expression 2 are satisfied, to a mask region (step S89). That is, diaphragm adjustment information including a mask region setting command and the like is output to the diaphragm adjustment unit 22 of the camera 2. After such a process is performed, the flow returns to step S80. Meanwhile, in the sample installation example shown in FIG. 15, a region denoted by sign 273 is a non-mask region, that is, a photometric region.

In this manner, according to the imaging device 9 of Embodiment 5, the sample is extracted from an image acquired from the imaging unit 21 and the image is divided into regions. The average luminance FAVG(T) of the sample region at time T and the average luminance RAVG(T, i) for each region at time T are calculated, and then the index F(T, i) of the region i at time T is calculated. Further, a standard deviation and an average of the indexes F(T1, i) to F(T2, i) at time T1 to T2 are obtained for each region. When a region in which standard deviation<threshold THS (Expression 1) and the absolute value of "average−setting value"<threshold THa (Expression 2) are established is present, a region excluding the above region is set to a mask region, and thus the non-mask region is set to a diaphragm adjustment region. Therefore, appropriate diaphragm adjustment can be performed even when a face is not imaged for a long period of time or the brightness of the face is different depending on a period of time.

Meanwhile, in Embodiment 5, the sample extraction unit 105 is provided to the recorder 10 side, but may be provided to the camera 2 side.

Embodiment 6

Figure 17:
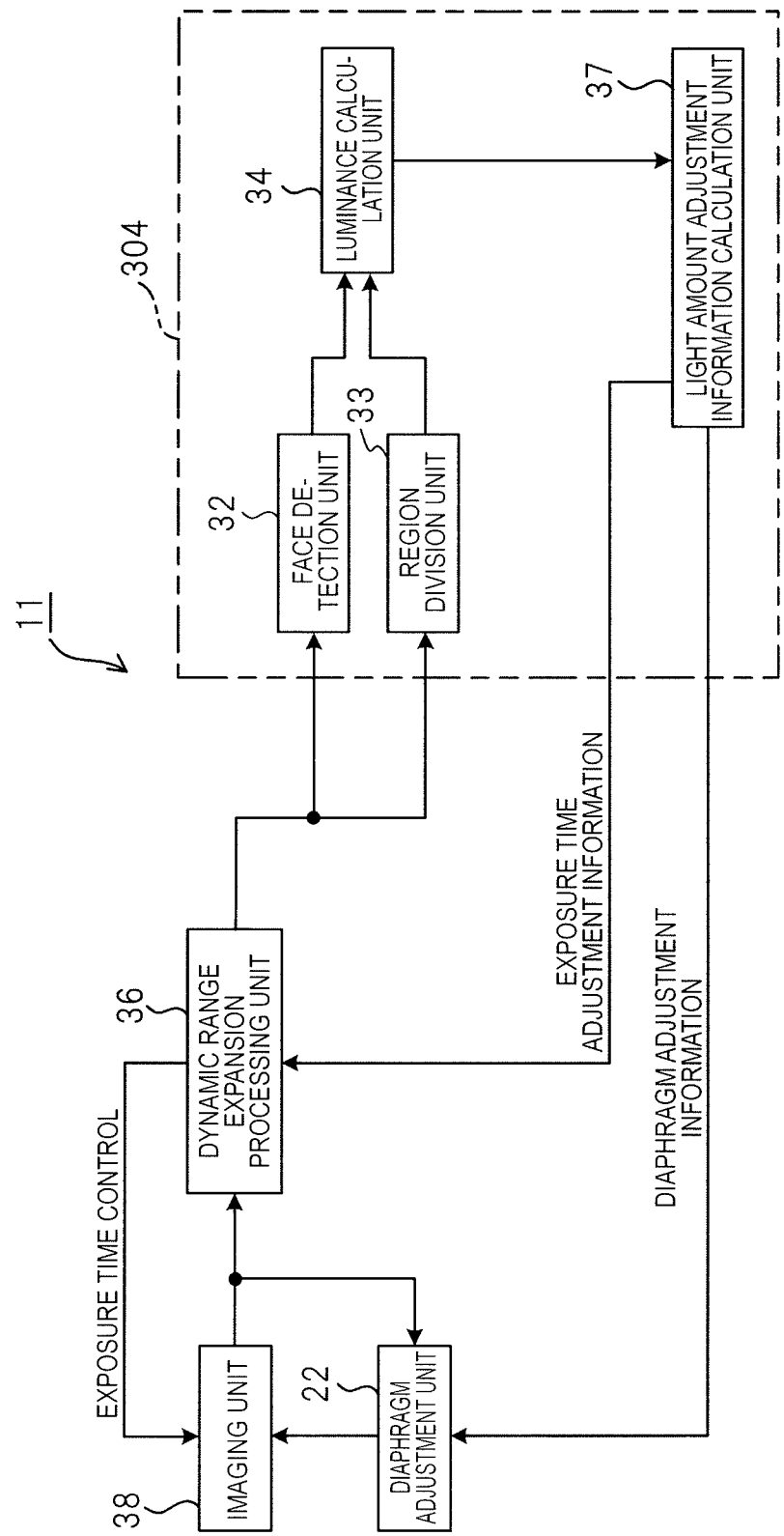
FIG. 17 is a block diagram illustrating a schematic configuration of an imaging device according to Embodiment 6 of the present invention.

FIG. 17 is a block diagram illustrating a schematic configuration of an imaging device according to Embodiment 6 of the present invention. Meanwhile, in the drawing, components common to those in FIG. 5 mentioned above are denoted by the same reference numerals and signs. An imaging device 11 according to Embodiment 6 is configured such that a dynamic range expansion processing unit 36 is added to the imaging device 4 according to Embodiment 2, the diaphragm adjustment information calculation unit 35 of the imaging device 4 according to Embodiment 2 is switched to a light amount adjustment information calculation unit 37 and the imaging unit 21 is switched to an imaging unit 38, and the photometric region extraction unit 41 is omitted. Meanwhile, the face detection unit 32, the region division unit 33, the luminance calculation unit 34 and the light amount adjustment information calculation unit 37 constitute an exposure control device 304.

When the exposure adjustment of a synthetic image synthesized by dividing images photographed at different exposure times into regions is performed, the imaging device 11 according to Embodiment 6 is configured to detect an object (for example, "face") for each region photographed at each of the exposure times, set a photometric region for performing the exposure adjustment of the object detected for each region, and perform the exposure adjustment using the photometric region for each of the different exposure times. The photometric region is set from the object photographed for a predetermined time or more within the region for each region.

The imaging unit 38 can control the exposure time from the outside. The dynamic range expansion processing unit 36 switches two types of exposure times with respect to the imaging unit 38 to photograph an image, and changes the mixing ratio of an exposure image for a long period of time to an exposure image for a short period of time which are obtained thereby. In this case, the mixing ratio has a different value for each photographing place. Meanwhile, imaging regions which are output between exposure for a long period of time and exposure for a short period of time may be switched. The face detection unit 32 detects an object region (herein, region of a person's face) from an image photographed in the imaging unit 38. The region division unit 33 divides the image photographed in the imaging unit 38 into regions of a plurality of (for example, 8×6) blocks. The luminance calculation unit 34 calculates the average luminance of a face region for each exposure time type (exposure for a long period of time/exposure for a short period of time), and calculates the average luminance for each region for each exposure time type (exposure for a long period of time/exposure for a short period of time).

The light amount adjustment information calculation unit 37 takes a difference between the average luminance of a face within an exposure region for a long period of time and the average luminance of a photometric region candidate (block obtained by dividing the image into a plurality of pieces), and determines a block in which "a time variation is small and a value is close to zero" as a photometric region for exposure for a long period of time. In addition, similarly, the unit takes a difference between the average luminance of a face within exposure for a short period of time region and the average luminance of the photometric region candidate (block obtained by dividing the image into a plurality of pieces), and determines a block in which "a time variation is small and a value is close to zero" as a photometric region for exposure for a short period of time. The light amount adjustment information calculation unit 37 then checks the luminances of two types of (exposure for a long period of time/exposure for a short period of time) photometric regions in the image, and outputs an exposure time change command as exposure time adjustment information or outputs a diaphragm control command as diaphragm adjustment information so that both luminances become close to a setting value (target luminance which is set in advance). In this case, the exposure time adjustment information is output to the dynamic range expansion processing unit 36, and the diaphragm adjustment information is output to the diaphragm adjustment unit 22. The diaphragm adjustment information refers to a command to open or close the diaphragm of the imaging unit 38. The command to open the diaphragm is output when both the exposure image for a long period of time and the exposure image for a short period of time are desired to be brightened, and the command to close the diaphragm is output when both the exposure images are desired to be darkened. The diaphragm adjustment unit 22 controls the diaphragm of the imaging unit 38 in accordance with the diaphragm adjustment information which is output from the light amount adjustment information calculation unit 37.

Figure 18:
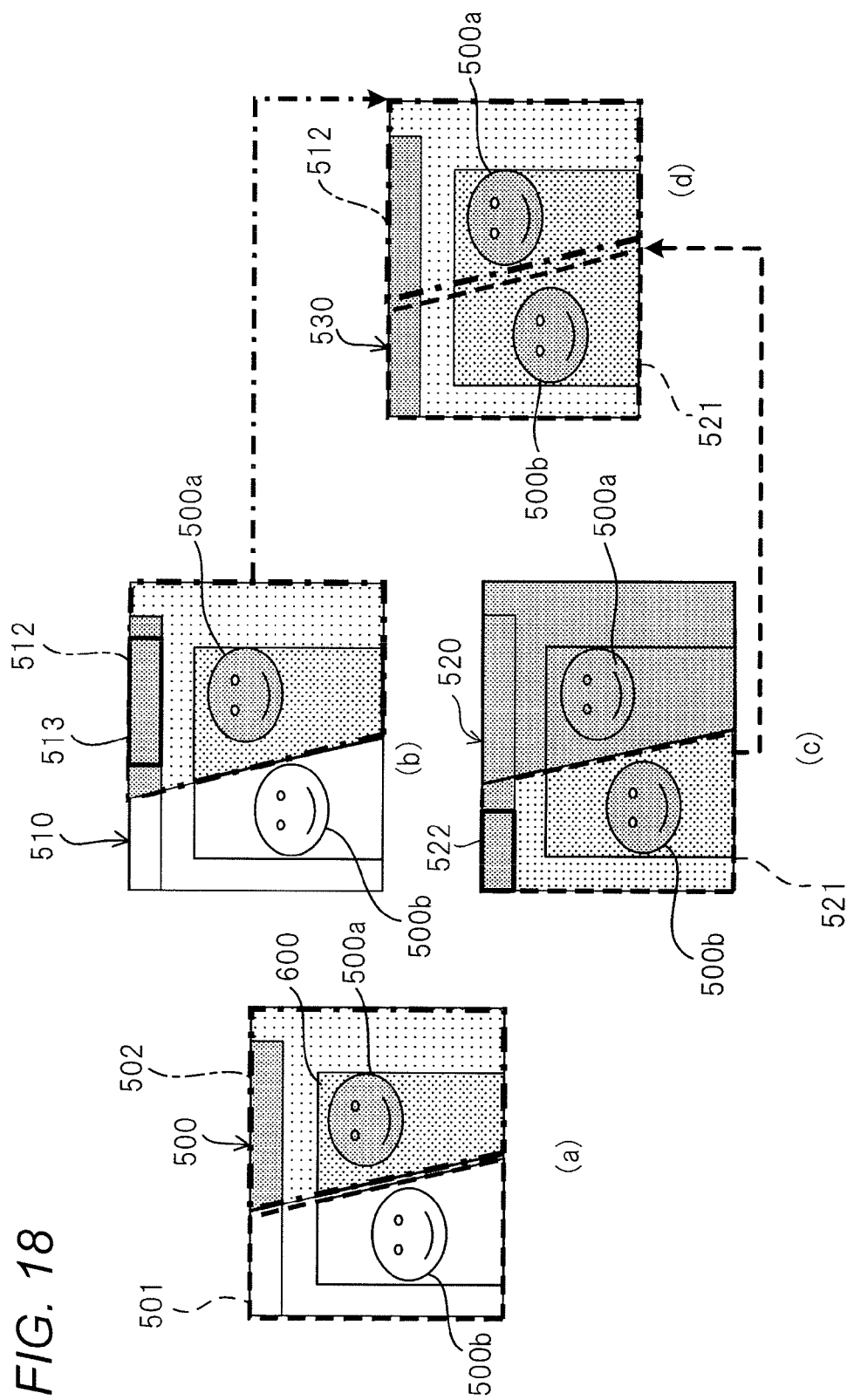
In FIG. 18, (a) to (d) are diagrams schematically illustrating a dynamic range expansion method in the imaging device of FIG. 17.

In FIGS. 18, (a) to 18(d) are diagrams schematically illustrating a dynamic range expansion method in the imaging device 11 according to Embodiment 6. FIG. 18(a) of the drawing is a diagram illustrating a photographing range 500 when the door portion of a building is photographed. When light falls on the left side of an entrance 600 rather than the right side thereof under the influence of outside light or the like, in the photographing range 500, a portion 501 on which light falls is bright and a portion 502 on which light does not fall is dark. In a case of such a photographing range, the portion 502 on which light does not fall is blurred in black when the exposure time is conformed to the portion 501 on which light falls, and the portion 501 on which light falls is whitened when the exposure time is conformed to the portion 502 on which light does not fall. Consequently, images obtained by changing the exposure time are photographed, and these images are synthesized.

FIG. 18(b) of the drawing is a diagram illustrating an exposure image 510 for a long period of time having a long exposure time. An image (hereinafter, called a "divided image") 512 corresponding to the portion 502 of the photographing range 500 is divided from the exposure image 510 for a long period of time. FIG. 18(c) of the drawing is a diagram illustrating an exposure image 520 for a short period of time having a short exposure time. An image (hereinafter, called a "divided image") 521 corresponding to the portion 501 of the photographing range 500 is divided from the exposure image 520 for a short period of time.

FIG. 18(d) of the drawing is a diagram illustrating a synthetic image 530 obtained by synthesizing the divided image 512 and the divided image 521. A face 500b of the portion 501 of the photographing range 500 and a face 500a of the portion 502 of the photographing range 500 are all photographed to the degree of being able to be confirmed by synthesizing the division image 512 of the exposure image 510 for a long period of time and the division image 521 of the exposure image 520 for a short period of time. In the exposure image 510 for a long period of time, a photometric region 513 is used as a region close to the brightness of the face 500a, and the diaphragm or the exposure time of the exposure image 510 for a long period of time is adjusted so that the brightness of the photometric region 513 is set to be appropriate. Similarly, in the exposure image 520 for a short period of time, a photometric region 522 is used as a region close to the brightness of the face 500b, and the diaphragm or the exposure time of the exposure image 520 for a short period of time is adjusted so that the brightness of the photometric region 522 is set to be appropriate. Such a process is performed, and thus the brightness of the entire image becomes uniform.

Figure 19:
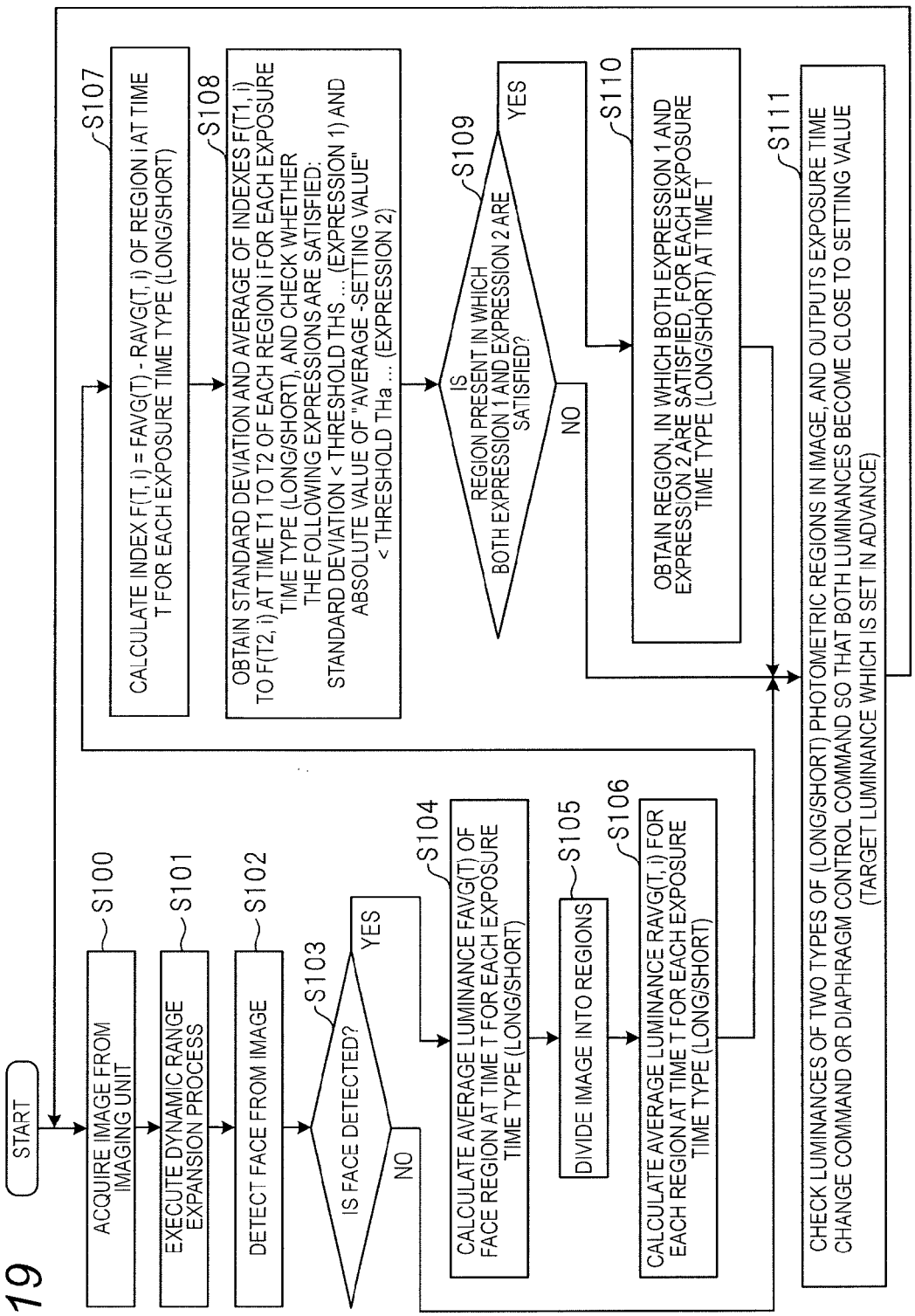
FIG. 19 is a flowchart illustrating exposure and a diaphragm control process in the imaging device of FIG. 17.

FIG. 19 is a flowchart illustrating an exposure and diaphragm control process of the imaging device 11 according to Embodiment 6. In the drawing, the dynamic range expansion processing unit 36 acquires an image from the imaging unit 38 (step S100), and executes a dynamic range expansion process (step S101). The dynamic range expansion processing unit 36 switches two types of exposure times with respect to the imaging unit 38 to photograph an image, and changes the mixing ratio of an exposure image for a long period of time to an exposure image for a short period of time which are obtained thereby. After the dynamic range expansion process is executed, the face detection unit 32 detects a person's face from an image after the dynamic range expansion process (step S102), and determines whether a face can be detected (step S103). When a face can be detected (that is, when the determination result of step S103 is "Yes"), the luminance calculation unit 34 calculates average luminance FAVG(T) of a face region at time T for each exposure time type (exposure for a long period of time/exposure for a short period of time) (step S104). After the luminance calculation unit 34 calculates the average luminance FAVG(T), the region division unit 33 divides an image, which is simultaneously acquired in the face detection unit 32, into regions (step S105). Meanwhile, the division of the image can be performed by not only block division, but also such a segmentation process as to arrange regions having the same color.

After the region division unit 33 divides the image into regions, the luminance calculation unit 34 calculates average luminance RAVG(T, i) for each region at time T for each exposure time type (exposure for a long period of time/ exposure for a short period of time) (step S106). Here, "T" refers to a time, and "i" refers to an i-th region. After the average luminance RAVG(T, i) is calculated, the light amount adjustment information calculation unit 37 calculates index F(T, i)=FAVG(T)−RAVG(T, i) of a region i at time T for each exposure time type (exposure for a long period of time/exposure for a short period of time) (step S107). Next, a standard deviation and an average of indexes F(T1, i) to F(T2, i) at time T1 to T2 of each region i are obtained for each exposure time type (exposure for a long period of time/exposure for a short period of time), and whether standard deviation<threshold THS . . . (Expression 1) and the absolute value "average−setting value"<threshold THa . . . (Expression 2) are established is checked (step S108). Here, the setting value refers to a parameter (for example, "0") which is set in advance.

The light amount adjustment information calculation unit 37 determines whether a region in which both Expression 1 and Expression 2 are satisfied is present (step S109). When it is determined that the region in which both Expression 1 and Expression 2 are satisfied is present (that is, when the determination result of step S109 is "Yes"), the region in which both Expression 1 and Expression 2 are satisfied is obtained for each exposure time type (exposure for a long period of time/exposure for a short period of time) at time T, and is set to a photometric region of the exposure time type (step S110). After the setting of the photometric region is performed, the light amount adjustment information calculation unit 37 checks the luminances of two types of (exposure for a long period of time/exposure for a short period of time) photometric regions in the image, and outputs exposure time adjustment information or diaphragm adjustment information so that both luminances become close to a setting value (target luminance which is set in advance) (step S111). In this case, the light amount adjustment information calculation unit 37 outputs a command to stop down the diaphragm when the luminances of both the photometric regions are larger than the setting value, and outputs a command to open the diaphragm when the luminances of both the photometric regions are smaller than the setting value. In addition, the unit outputs a command to lengthen the exposure time of the exposure time type (exposure for a long period of time/exposure for a short period of time) when the luminance of one photometric region is smaller than the setting value, and outputs a command to shorten the exposure time of the exposure time type (exposure for a long period of time/exposure for a short period of time) when the luminance of one photometric region is larger than the setting value.

On the other hand, when it is determined in the determination of step S109 that the region in which both Expression 1 and Expression 2 are satisfied is not present (that is, when the determination result of step S109 is "No"), the light amount adjustment information calculation unit 37 does not set the photometric region, and performs the process of step S111.

After the process of step S111 is performed, the flow returns to the process of step S100. In addition, when it is determined in the determination of step S103 that a face is not detected (that is, when the determination result of step S103 is "No"), the process of step S111 is performed directly.

In this manner, according to the imaging device 11 of Embodiment 6, when a face is detected from the image photographed in the imaging unit 38, the average luminance FAVG(T) of the face region at time T is calculated for each exposure time type (exposure for a long period of time/ exposure for a short period of time), and then the image is divided into regions to calculate the average luminance RAVG(T, i) for each region at time T for each exposure time type (exposure for a long period of time/exposure for a short period of time). Thereafter, index F(T, i)=FAVG(T)−RAVG (T, i) of the region i at time T is calculated for each exposure time type (exposure for a long period of time/exposure for a short period of time), and the standard deviation and the average of the indexes F(T1, i) to F(T2, i) at time T1 to T2 of each region i are obtained for each exposure time type (exposure for a long period of time/exposure for a short period of time). When the region in which both standard deviation<threshold THS and the absolute value of "average−setting value"<threshold THa are satisfied is present, the region is obtained for each exposure time type (exposure for a long period of time/exposure for a short period of time) at time T, and is set to a photometric region of the exposure time type. Next, the luminances of two types of (exposure for a long period of time/exposure for a short period of time) photometric regions in the image are checked, and the exposure time of the imaging unit 38 is controlled or the diaphragm is controlled so that both luminances become close to the setting value. Therefore, in a photographing environment lacking in a dynamic range, it is possible to perform appropriate exposure adjustment even in a situation where the dynamic range expansion process is in operation, and to obtain an image of which the brightness is averaged.

Embodiment 7

Figure 20:
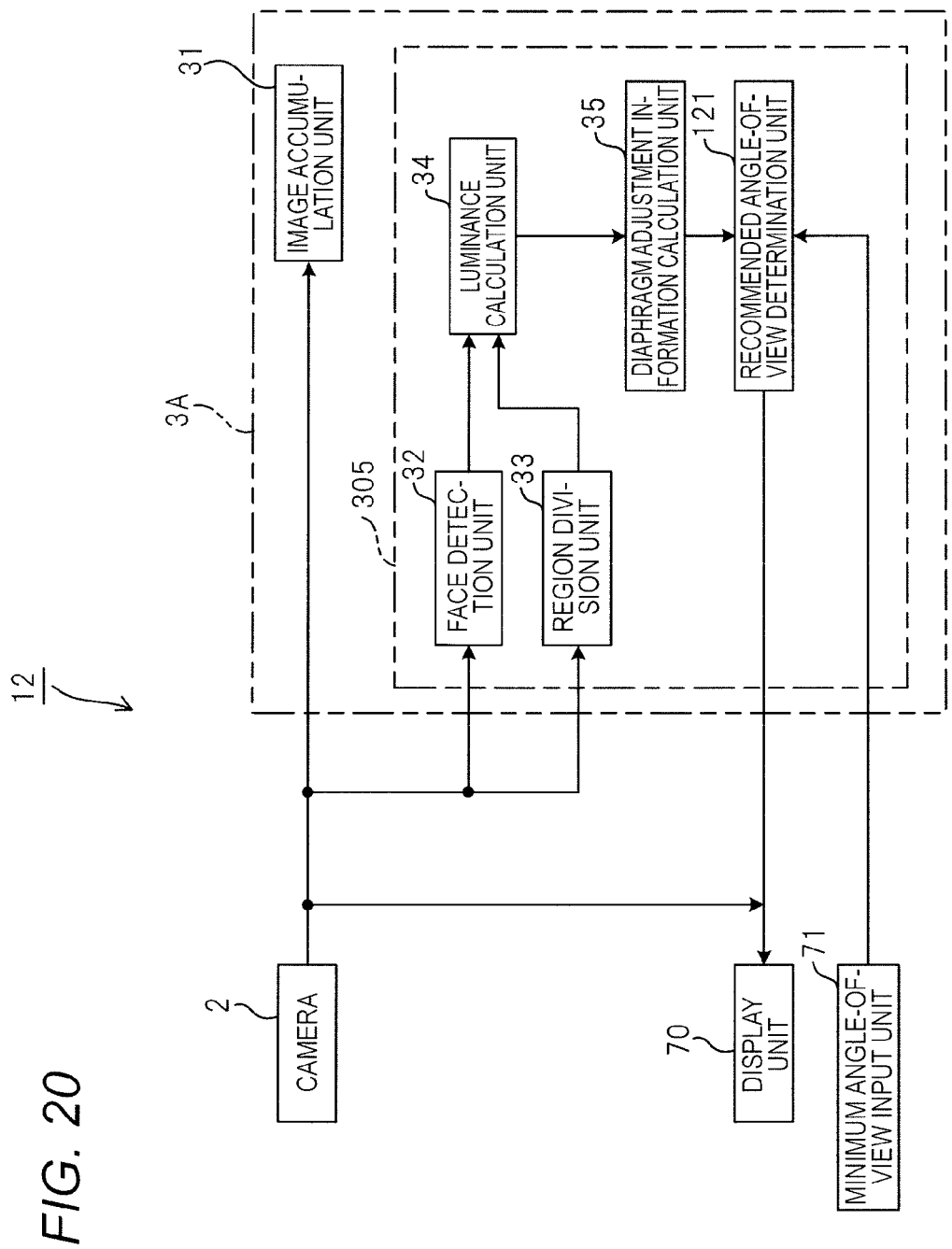
FIG. 20 is a block diagram illustrating a schematic configuration of an imaging device according to Embodiment 7 of the present invention.

FIG. 20 is a block diagram illustrating a schematic configuration of an imaging device according to Embodiment 7 of the present invention. Meanwhile, in the drawing, components common to those in FIG. 1 mentioned above are denoted by the same reference numerals and signs. A recorder 3A of the imaging device 12 according to Embodiment 7 includes a camera installation support device 305 constituted by the face detection unit 32, the region division unit 33, the luminance calculation unit 34, the diaphragm adjustment information calculation unit 35 and a recommended angle-of-view determination unit 121. The camera installation support device 305 is configured such that presentation is made so as to set a photometric region for performing the exposure adjustment of an object (for example, "face") within an image photographed in a first photographing range, and to set a second photographing range smaller than the first photographing range in a range including the photometric region. The imaging device 12 includes a minimum angle-of-view input unit 71 for a user to manually specify a minimum angle of view, in the outside of the recorder 3A. With the camera installation support device 305 that supports camera installation, and thus it is possible for a user to know an image automatically including an appropriate photometric region.

When the minimum angle of view is specified by the minimum angle-of-view input unit 71, the recommended angle-of-view determination unit 121 determines a recommended angle of view using an intermediate result (photometric region estimation result) of the diaphragm adjustment information calculation unit 35, and presents the determined angle of view to a user. The recommended angle-of-view determination unit 121 obtains a rectangular shape which includes the minimum angle of view specified by a user and a photometric region of a predetermined number or more and has a minimum area, and determines the rectangular region as the recommended angle of view. Meanwhile, the photometric region is obtained by taking a difference between the average luminance of a face and the average luminance of a photometric region candidate (block obtained by dividing a screen). That is, the difference between the average luminance of the face and the average luminance of the photometric region candidate is taken, and a block in which "a temporal variation is small and a value is close to zero" is set to a photometric region.

Figure 21:
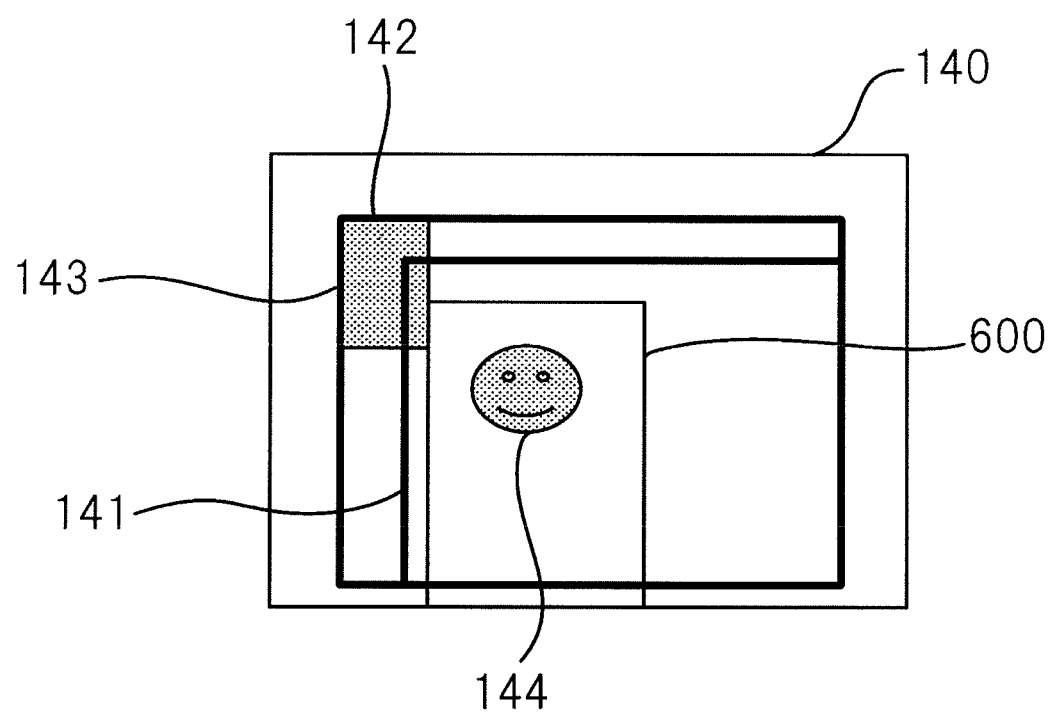
FIG. 21 is a diagram illustrating a camera installation support process in the imaging device of FIG. 20.
Figure 22:
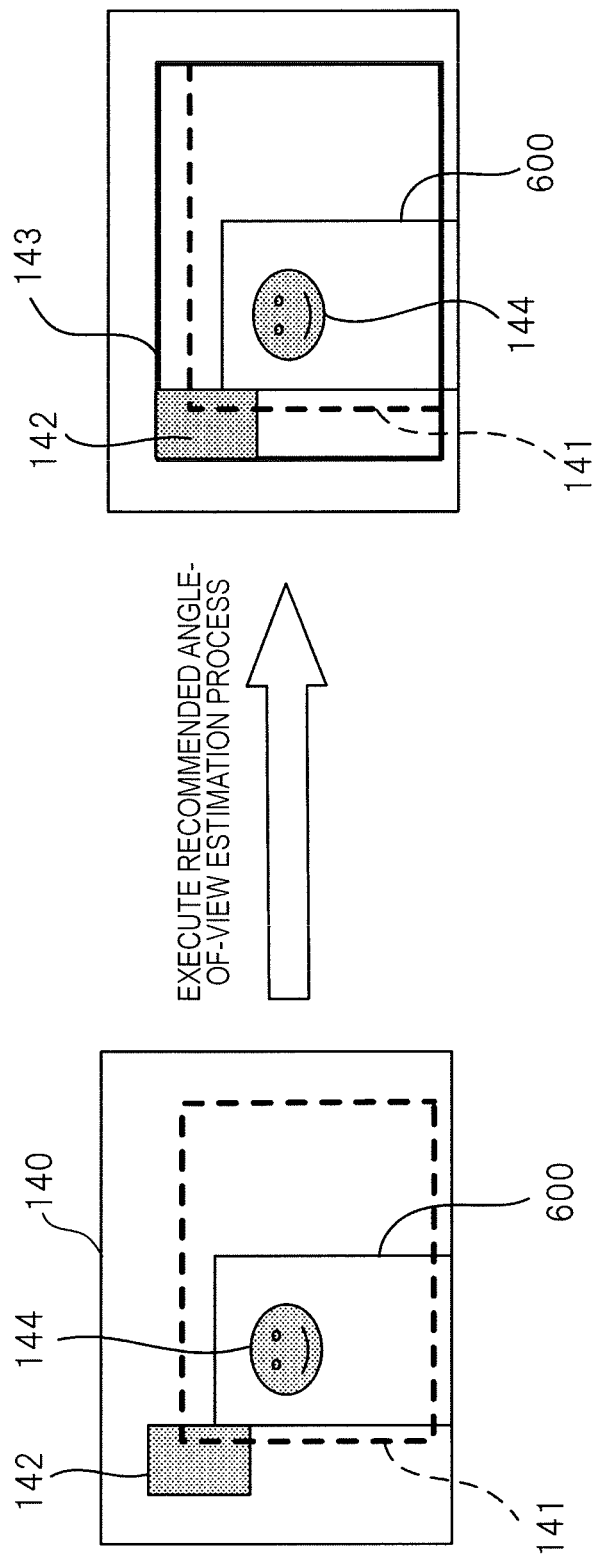
FIG. 22 is a diagram illustrating a camera installation support process in the imaging device of FIG. 20.

FIGS. 21 and 22 are diagrams illustrating a camera installation support process of the imaging device 12 according to Embodiment 7. In FIG. 21, an angle of view 140 is an angle of view (first photographing range) set up temporarily which is a range for searching for an optimum angle of view. An angle of view 141 is a minimum angle of view specified by a user. A region 142 is a region close to the brightness of a face 144 regardless of the period of time. The brightness of the region 142 is used in diaphragm adjustment. That is, the region 142 is used as a photometric region. The region 142 is not almost included in the minimum angle of view 141 specified by a user. By executing a recommended angle-of-view estimation process in this state, as shown in FIG. 22, the minimum angle of view 141 specified by a user is changed, and an angle of view (second photographing range) 143 having a small area is determined including the region 142 serving as a photometric region. Meanwhile, the recommended angle of view which is determined is displayed on a display unit 70 together with the image photographed in the camera 2.

Figure 23:
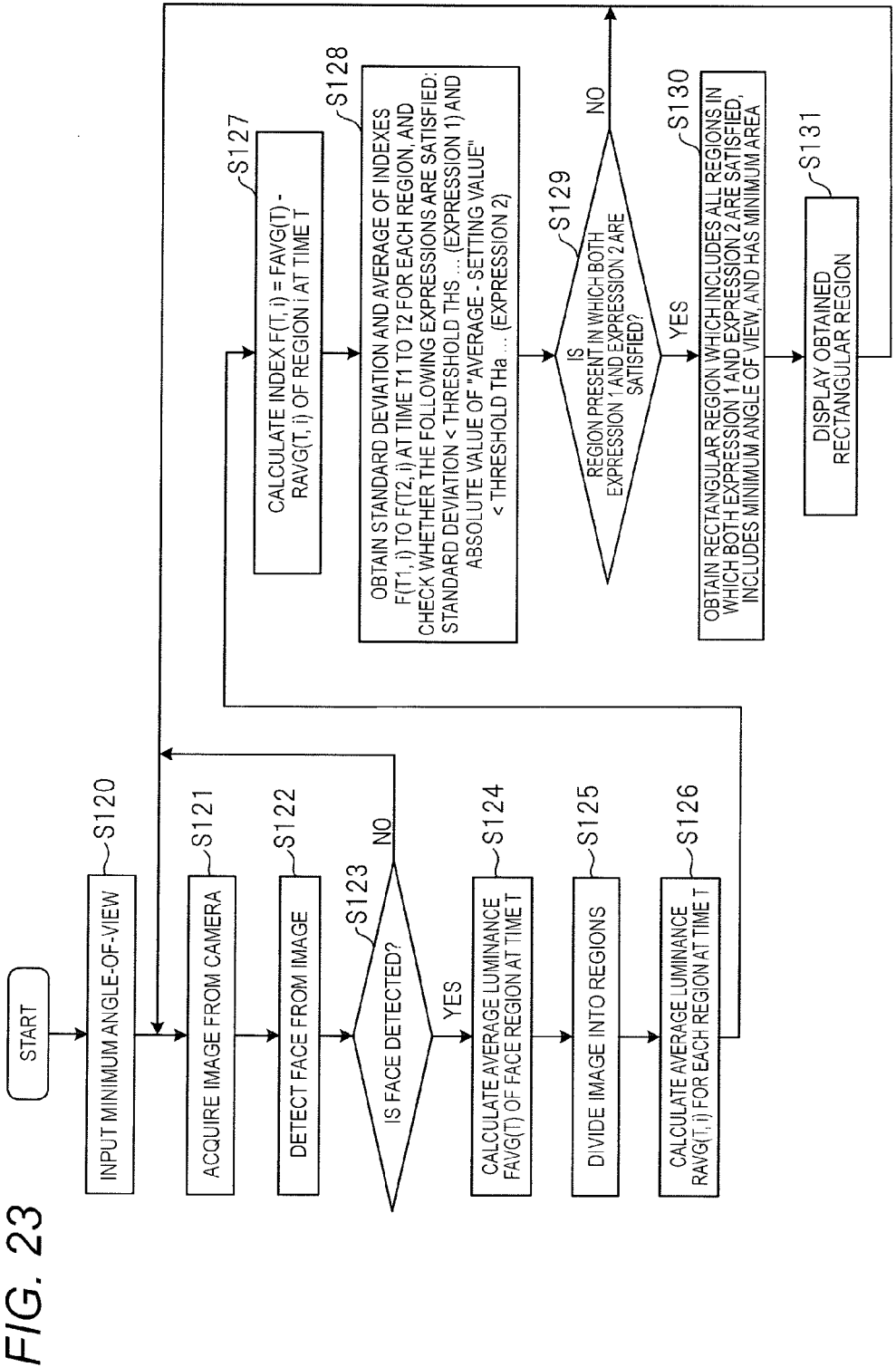
FIG. 23 is a flowchart illustrating a camera installation support process in the imaging device of FIG. 20.

FIG. 23 is a flowchart illustrating a camera installation support process of the imaging device 12 according to Embodiment 7. In the drawing, the recommended angle-of-view determination unit 121 first inputs a minimum angle of view from the minimum angle-of-view input unit 71 (step S120). Next, the face detection unit 32 acquires an image from the camera 2 (step S121), and detects a person's face (step S122). Whether the person's face can be detected is then determined (step S123). When the face cannot be detected (that is, when the determination result of step S123 is "No"), the process from step S121 is resumed. When the face can be detected (that is, when the determination result of step S123 is "Yes"), the luminance calculation unit 34 calculates average luminance FAVG(T) of a face region at time T (step S124). After the luminance calculation unit 34 calculates the average luminance FAVG(T), the region division unit 33 divides an image, which is simultaneously acquired in the face detection unit 32, into regions (step S125). Meanwhile, the division of the image can be performed by not only block division, but also such a segmentation process as to arrange regions having the same color.

After the region division unit 33 divides the image into regions, the luminance calculation unit 34 calculates average luminance RAVG(T, i) for each region at time T (step S126). Here, "T" refers to a time, and "i" refers to an i-th region. After the average luminance RAVG(T, i) is calculated, the diaphragm adjustment information calculation unit 35 calculates index F(T, i)=FAVG(T)−RAVG(T, i) of a region i at time T (step S127). Next, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S128). Here, the setting value refers to a parameter (for example, "0") which is set in advance.

The diaphragm adjustment information calculation unit 35 determines whether a region in which both Expression 1 and Expression 2 are satisfied is present (step S129). When the diaphragm adjustment information calculation unit 35 determines that the region in which both Expression 1 and Expression 2 are satisfied is present (that is, when the determination result of step S129 is "Yes"), the recommended angle-of-view determination unit 121 obtains a rectangular region which includes all the regions in which both Expression 1 and Expression 2 are satisfied, includes a minimum angle of view, and has a minimum area (step S130). The obtained rectangular region is then displayed on the display unit 70 (step S131). On the other hand, when the diaphragm adjustment information calculation unit 35 determines, in the determination of step S129, that the region in which both Expression 1 and Expression 2 are satisfied is not present (that is, when the determination result of step S129 is "No"), the process from step S121 is resumed.

In this manner, according to the imaging device 12 of Embodiment 7, when a face is detected from the image photographed in the camera 2, the average luminance FAVG (T) of the face region at time T is calculated, and then the average luminance RAVG(T, i) for each region at time T is calculated by dividing the image into regions. Thereafter, index F(T, i)=FAVG(T)−RAVG(T, i) of the region i at time T is calculated, and the standard deviation and the average of the indexes F(T1, i) to F(T2, i) at time T1 to T2 of each region i are obtained for each region. When the region in which both standard deviation<threshold THS and the absolute value of "average−setting value"<threshold THa are satisfied is present, a rectangular region which includes all the regions, includes a minimum angle of view, and has a minimum area is obtained, the obtained rectangular region is displayed on the display unit 70. Therefore, it is possible for a user to know an angle of view automatically including an appropriate photometric region.

Meanwhile, in the imaging device 12 according to Embodiment 7, at least one place that necessarily falls within the angle of view may be specified instead of inputting the minimum angle of view.

In addition, in the imaging device 12 according to Embodiment 7, a sample (for example, flesh-colored cushion) may be installed in a region desired to be monitored and be used with a face, and the average luminance of the sample may be used instead of the face.

In addition, in the imaging device 12 according to Embodiment 7, at least one of the face detection unit 32 and the region division unit 33 may be caused to be built in the camera 2, and the camera installation support device 305 itself may be caused to be built in the camera 2.

In addition, in the imaging device 12 according to Embodiment 7, a recommended angle of view is transmitted to a portable terminal or the like by adding transmission means, and thus may be displayed on the portable terminal. In this case, a transmission timing may be specified in advance (for example, after one minutes, after ten minutes, after one hour, after two hours, and the like).

Embodiment 8

Figure 24:
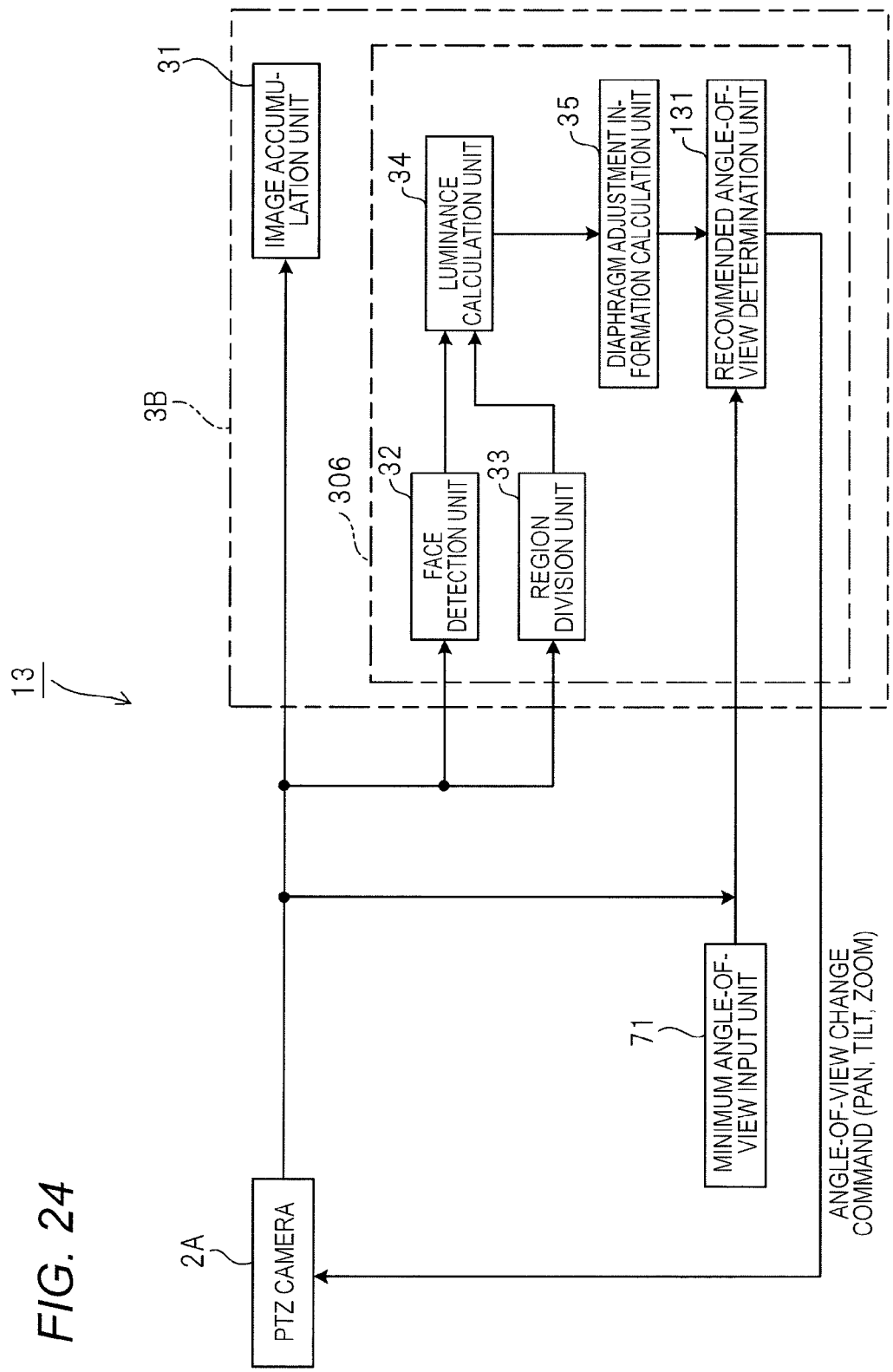
FIG. 24 is a block diagram illustrating a schematic configuration of an imaging device according to Embodiment 8 of the present invention.

FIG. 24 is a block diagram illustrating a schematic configuration of an imaging device according to Embodiment 8 of the present invention. Meanwhile, in the drawing, components common to those in FIGS. 1 and 20 mentioned above are denoted by the same reference numerals and signs. The imaging device 12 according to Embodiment 7 mentioned above is configured to perform camera installation support on the general camera 2, but an imaging device 13 according to Embodiment 8 is configured to perform camera installation support when a PTZ (pan, tilt, zoom) camera 2A is used. A recorder 3B of the imaging device 13 according to Embodiment 8 includes a camera installation support device 306 constituted by the face detection unit 32, the region division unit 33, the luminance calculation unit 34, the diaphragm adjustment information calculation unit 35 and a recommended angle-of-view determination unit 131. The recommended angle-of-view determination unit 131 has a function of performing PTZ control on the PTZ camera 2A, other than to have the same function as that of the recommended angle-of-view determination unit 121 of the imaging device 12 according to Embodiment 7.

When the minimum angle of view is specified by the minimum angle-of-view input unit 71, the recommended angle-of-view determination unit 131 determines a recommended angle of view using an intermediate result (photometric region estimation result) of the diaphragm adjustment information calculation unit 35. The recommended angle-of-view determination unit 131 obtains a rectangular shape which includes the minimum angle of view specified by a user and a photometric region of a predetermined number or more and has a minimum area, and determines the rectangular region as the recommended angle of view. After the recommended angle of view is determined, an angle-of-view change process is performed.

Figure 25:
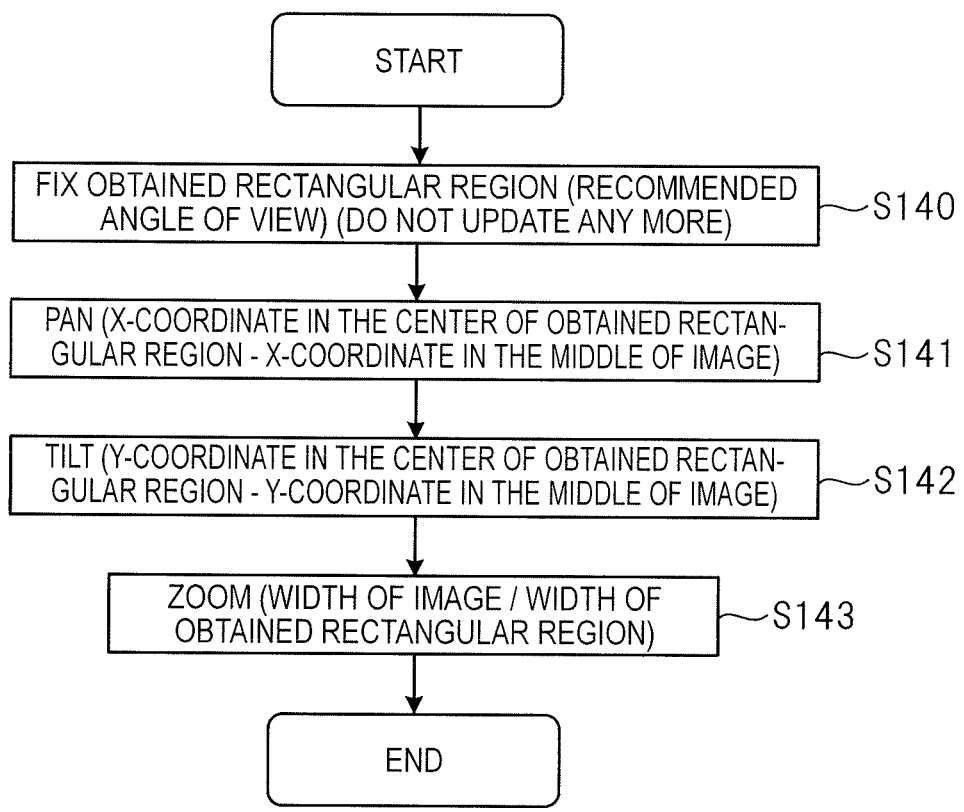
FIG. 25 is a flowchart illustrating an angle-of-view change process in the imaging device of FIG. 24.

FIG. 25 is a flowchart illustrating an angle-of-view change process of the recommended angle-of-view determination unit 131. In the drawing, the obtained rectangular region (recommended angle of view) is first fixed (step S140). Next, the pan of (X-coordinate in the center of the obtained rectangular region-X-coordinate in the middle of the image) is performed (step S141). Next, the tilt of (Y-coordinate in the center of the obtained rectangular region-Y-coordinate in the middle of the image) is performed (step S142). Next, the zoom of (width of the image width of the obtained rectangular region) is performed (step S143). Meanwhile, the timing of a change in the angle of view may be set in advance such as, for example, "ten minutes after process start", and may be a time when a user sees a recommended angle of view and an angle-of-view change instruction command is input. For example, automatical adjustment to a recommended angle of view is first performed during camera installation and then an operation for an installer to correct the angle of view is performed, the timing of a change in the angle of view may be set in advance.

Meanwhile, in the imaging device 13 according to Embodiment 8, the camera installation support device 306 may be caused to be built in the PTZ camera 2A.

Embodiment 9

Figure 26:
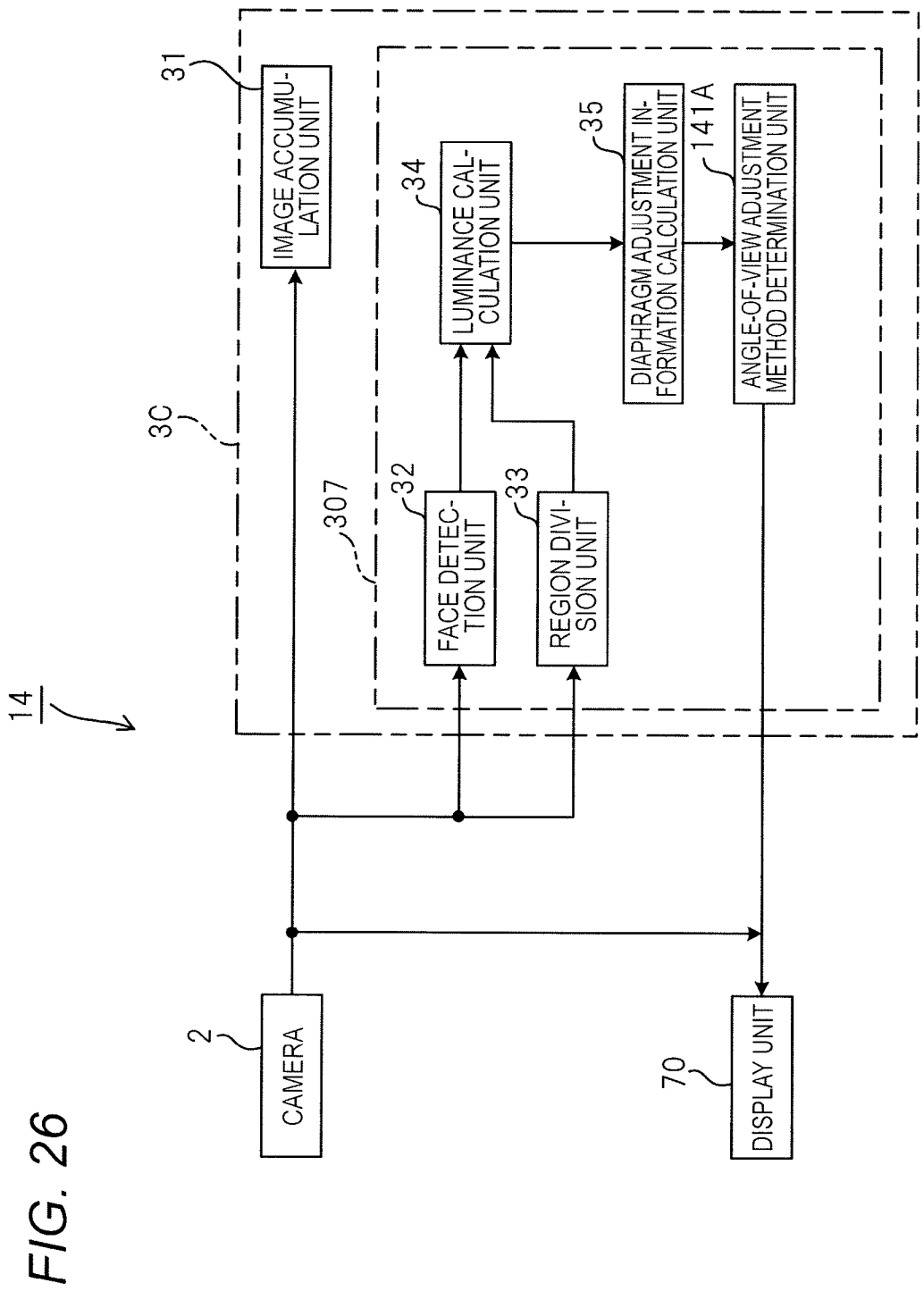
FIG. 26 is a block diagram illustrating a schematic configuration of an imaging device according to Embodiment 9 of the present invention.

FIG. 26 is a block diagram illustrating a schematic configuration of an imaging device according to Embodiment 9 of the present invention. Meanwhile, in the drawing, components common to those in FIG. 1 mentioned above are denoted by the same reference numerals and signs. A recorder 3C of an imaging device 14 according to Embodiment 9 includes a camera installation support device 307 constituted by the face detection unit 32, the region division unit 33, the luminance calculation unit 34, the diaphragm adjustment information calculation unit 35 and an angle-of-view adjustment method determination unit 141A. The camera installation support device 307 is configured such that presentation is made so as to set a photometric region for performing the exposure adjustment of an object (for example, "face") within an image photographed in a first photographing range, and to set a second photographing range in the direction of a boundary of the first photographing range when the photometric region is located at the boundary. With the camera installation support device 307 that supports camera installation, a user can set an angle of view having a tendency to perform automatic diaphragm adjustment.

Figure 27:
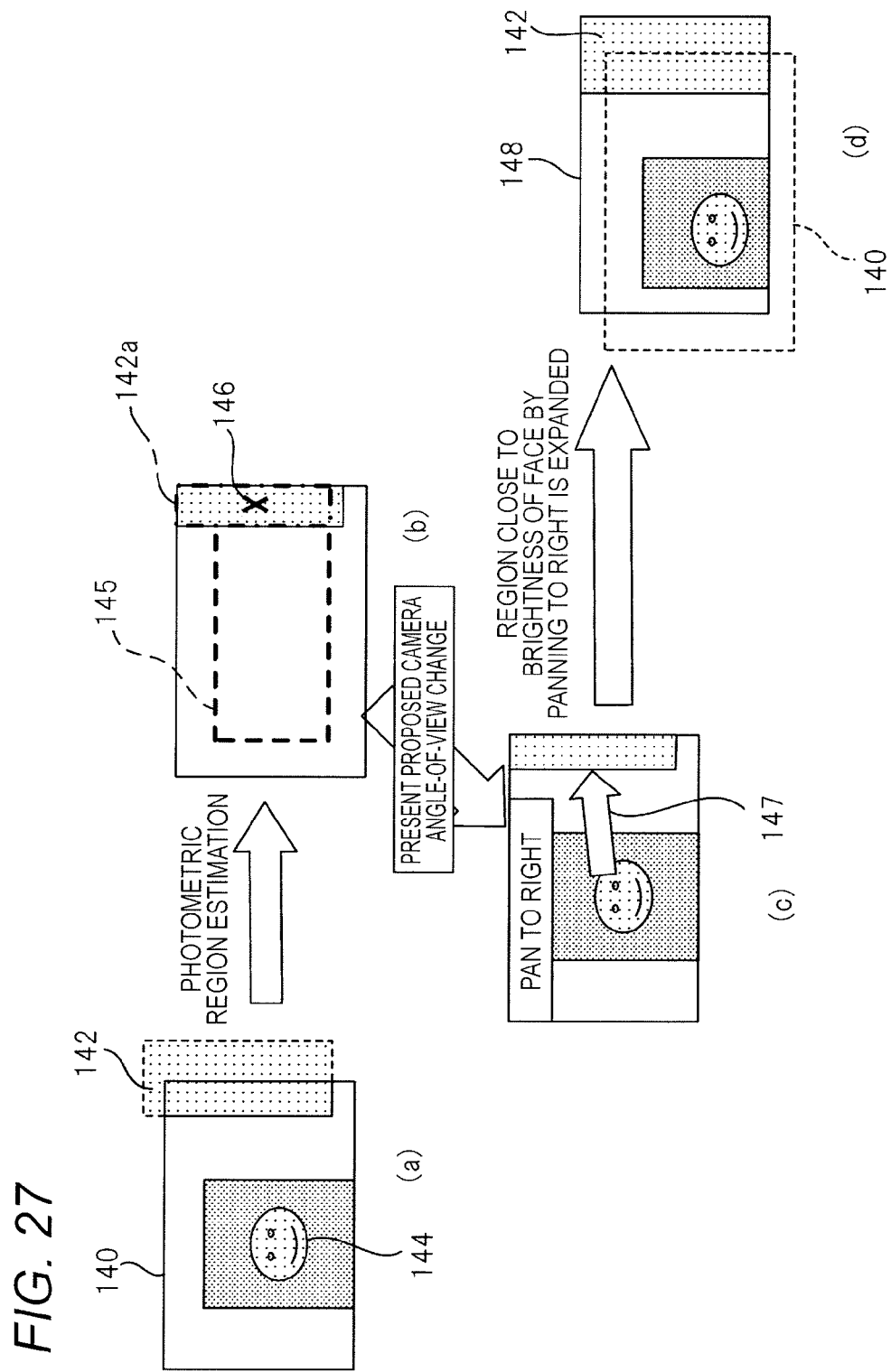
In FIG. 27, (a) to (d) are diagrams illustrating a camera installation support process in the imaging device of FIG. 26.

FIGS. 27(a) to 29(d) are diagrams illustrating a camera installation support process in the imaging device 14 according to Embodiment 9. First, as shown in FIG. 27(a), in the current angle of view (first photographing range) 140, when the region 142 close to the brightness of the face 144 is located at the end of the screen and the outside of the screen, a photometric region 142a as shown in FIG. 27(b) is obtained by a photometric region estimation. When the photometric region 142a is located at a region on the end of the screen and at a boundary 145 of the inside region, an estimated centroid position 146 of the photometric region 142a is obtained, and a proposed camera angle-of-view change is presented. In this case, as shown in FIG. 27(c), an arrow 147 which is directed to the centroid position 146 from, for example, the center of the image is displayed on the display unit 70, a message of "Please pan to the right" is displayed. A user pans the camera 2 to the right in accordance with the presentation. Thereby, the region 142 close to the brightness of the face 144 is expanded. As shown in FIG. 27(d), the substantially entire region 142 falls within an angle of view (second photographing range) 148 after change.

Figure 28:
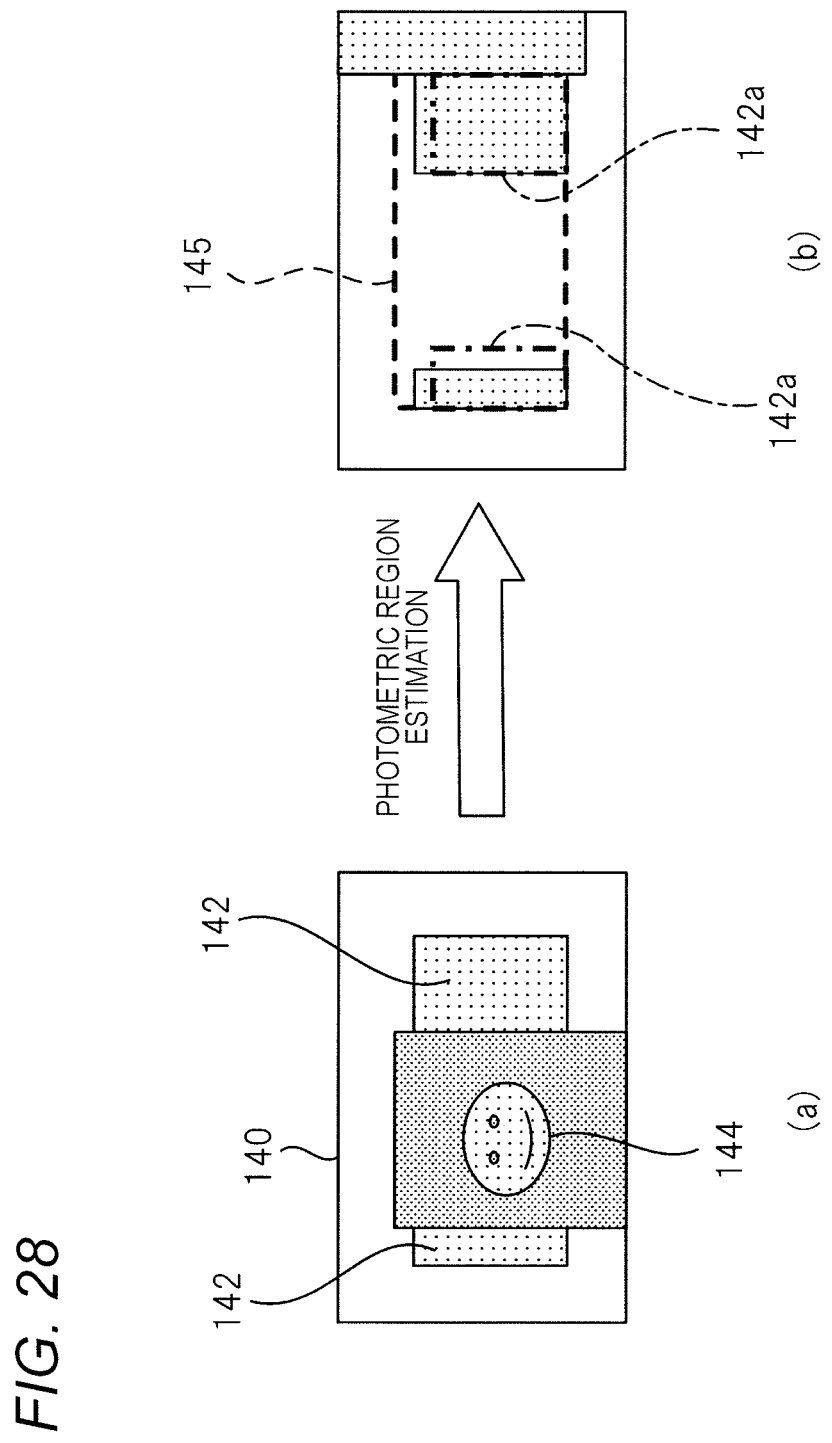
In FIG. 28, (a) and (b) are diagrams illustrating a camera installation support process in the imaging device of FIG. 26.

Next, as shown in FIG. 28(a), in the current angle of view 140, when the region 142 close to the brightness of the face 144 is present in a place which is not the end of the screen, two photometric regions 142a as shown in FIG. 28 (b) are obtained by the photometric region estimation, and these photometric regions 142a are not present in the region on the end of the screen and the boundary 145 of the inside region. Therefore, the recommendation of a change in the angle of view is not performed.

Figure 29:
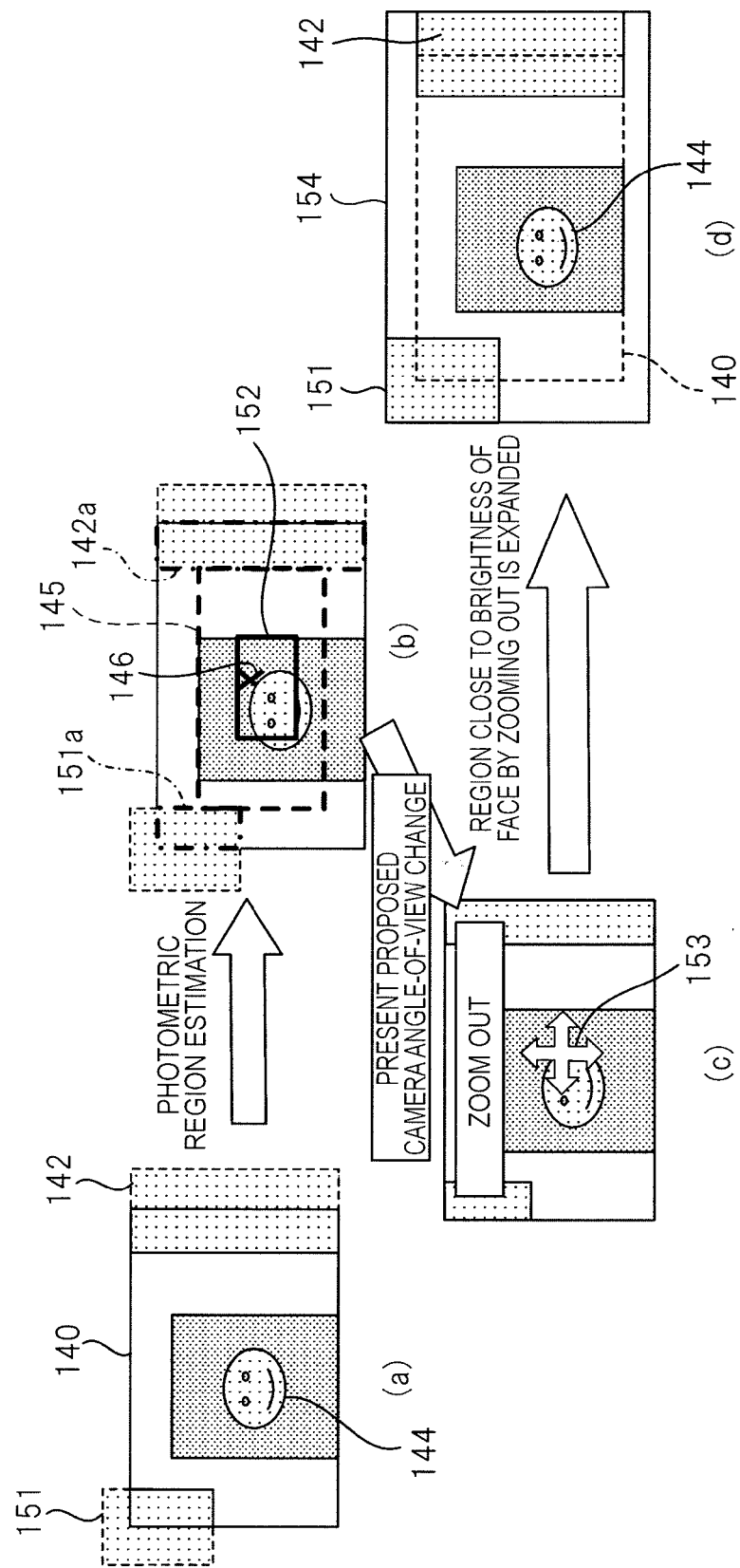
In FIG. 29, (a) to (d) are diagrams illustrating a camera installation support process in the imaging device of FIG. 26.

Next, as shown in FIG. 29(a), in the current angle of view (first photographing range) 140, when regions 142 and 151 close to the brightness of the face 144 are located at the end of the screen and the outside of the screen, photometric regions 142a and 151a as shown in FIG. 29 (b) are obtained by the photometric region estimation, and these photometric regions 142a and 151a are located at the ene of the screen (outside of the boundary 145). However, when the centroid position 146 is located in the vicinity of the image center (in a frame 152), zoom out is presented. In this case, as shown in FIG. 29(c), on the display unit 70, for example, arrows 153 in four directions are displayed, and a message of "Please zoom out" is displayed. A user zooms out the camera 2 in accordance with the presentation. Thereby, a region close to the brightness of the face 144 is expanded. As shown in FIG. 29(d), the substantially entire regions 142 and 151 fall within an angle of view (second photographing range) 154 after change.

Figure 30:
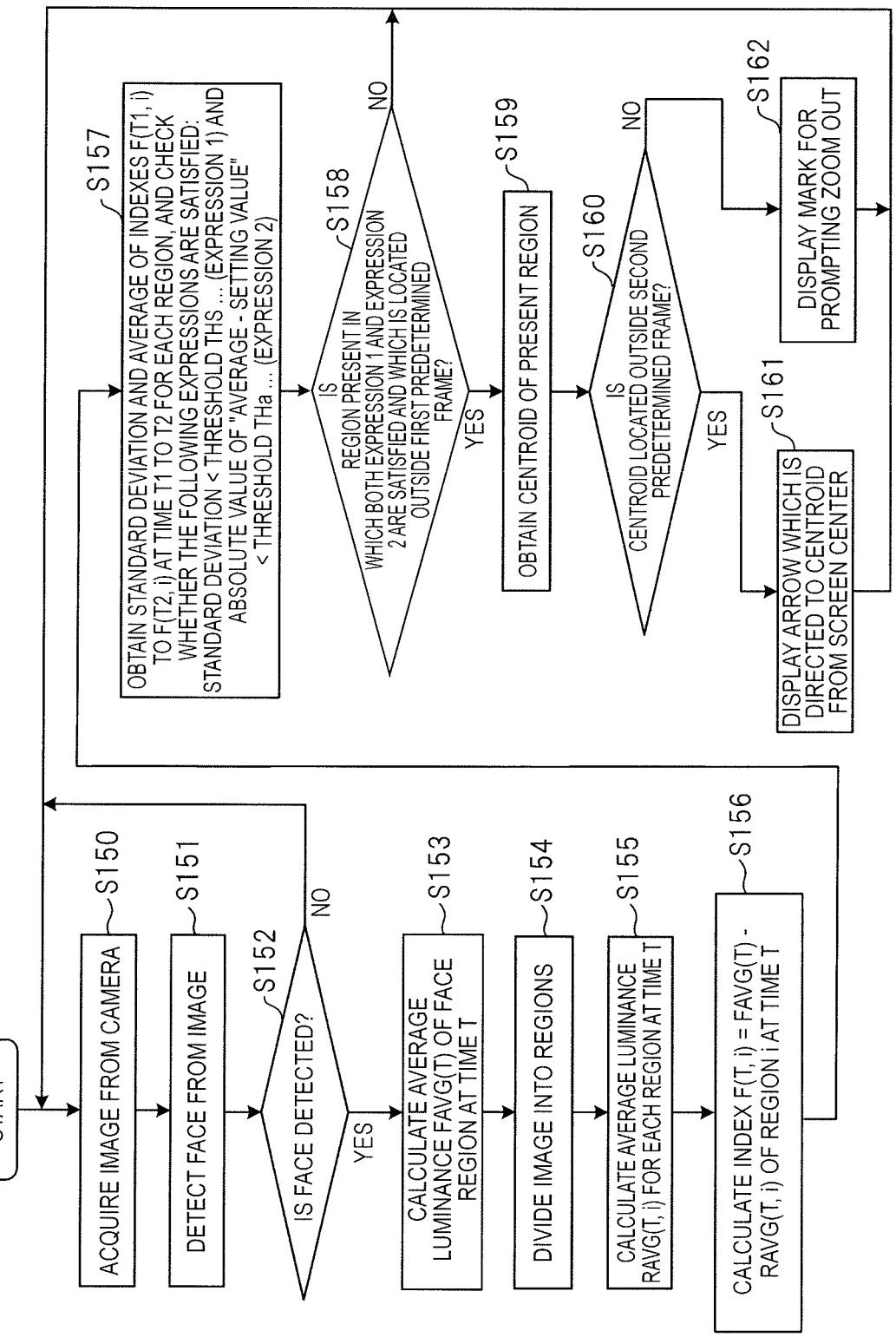
FIG. 30 is a flowchart illustrating a camera installation support process in the imaging device of FIG. 26.

FIG. 30 is a flowchart illustrating a camera installation support process of the imaging device 14 according to Embodiment 9. In the drawing, the face detection unit 32 first acquires an image from the camera 2 (step S150), and detects a person's face (step S151). Whether the person's face can be detected is then determined (step S152). When the face cannot be detected (that is, when the determination result of step S152 is "No"), the process from step S150 is resumed. When the face can be detected (that is, when the determination result of step S152 is "Yes"), the luminance calculation unit 34 calculates average luminance FAVG(T) of a face region at time T (step S153). After the luminance calculation unit 34 calculates the average luminance FAVG (T), the region division unit 33 divides an image, which is simultaneously acquired in the face detection unit 32, into regions (step S154). Meanwhile, the division of the image can be performed by not only block division, but also such a segmentation process as to arrange regions having the same color.

After the region division unit 33 divides the image into regions, the luminance calculation unit 34 calculates average luminance RAVG(T, i) for each region at time T (step S155). Here, "T" refers to a time, and "i" refers to an i-th region. After the average luminance RAVG(T, i) is calculated, the diaphragm adjustment information calculation unit 35 calculates index F(T, i)=FAVG(T)−RAVG(T, i) of a region i at time T (step S156). Next, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S157). Here, the setting value refers to a parameter (for example, "0") which is set in advance.

Next, the angle-of-view adjustment method determination unit 141A determines a region in which both Expression 1 and Expression 2 are satisfied and which is located outside a first predetermined frame is present (step S158). When it is determined that the region is present (that is, when the determination result of step S158 is "Yes"), the centroid of the present region is obtained (step S159). Whether the obtained centroid is located outside a second predetermined frame is then determined (step S160). When it is determined that the obtained centroid is located outside the second predetermined frame (that is, when the determination result of step S160 is "Yes"), an arrow which is directed to the centroid from the screen center is displayed, and a message of, for example, "Please pan" is displayed (step S161). On the other hand, when it is determined that the obtained centroid is not located outside the second predetermined frame (that is, when the determination result of step S160 is "No"), a mark for prompting zoom out is displayed, and a message of, for example, "Please zoom out" is displayed (step S162). On the other hand, when the angle-of-view adjustment method determination unit 141A determines, in the determination of step S158, that the region in which both Expression 1 and Expression 2 are satisfied and which is located outside the first predetermined frame is not present (that is, when the determination result is "No"), the process from step S150 is resumed. In addition, when the process of step S161 or step S162 is terminated, the process from step S150 is resumed.

In this manner, according to the imaging device 14 of Embodiment 9, when a face is detected from the image photographed in the camera 2, the average luminance FAVG (T) of the face region at time T is calculated, and then the average luminance RAVG(T, i) for each region at time T is calculated by dividing the image into regions. Thereafter, index F(T, i)=FAVG(T)−RAVG(T, i) of the region i at time T is calculated, and the standard deviation and the average of the indexes F(T1, i) to F(T2, i) at time T1 to T2 of each region i are obtained for each region. When the region in which both standard deviation<threshold THS and the absolute value of "average−setting value"<threshold THa are satisfied and which is located outside the first predetermined frame is present, the centroid of the present region is obtained. When the obtained centroid is located outside the second predetermined frame, an arrow which is directed to the centroid from the screen center is displayed. When the centroid is not located outside the second predetermined frame, a mark for prompting zoom out is displayed. Therefore, a user can easily set an angle of view having a tendency to perform automatic diaphragm adjustment.

Meanwhile, in the imaging device 14 according to Embodiment 9, a sample (for example, flesh-colored cushion) may be installed in a region desired to be monitored and be used with a face, and the average luminance of the sample may be used instead of the face.

Figure 31:
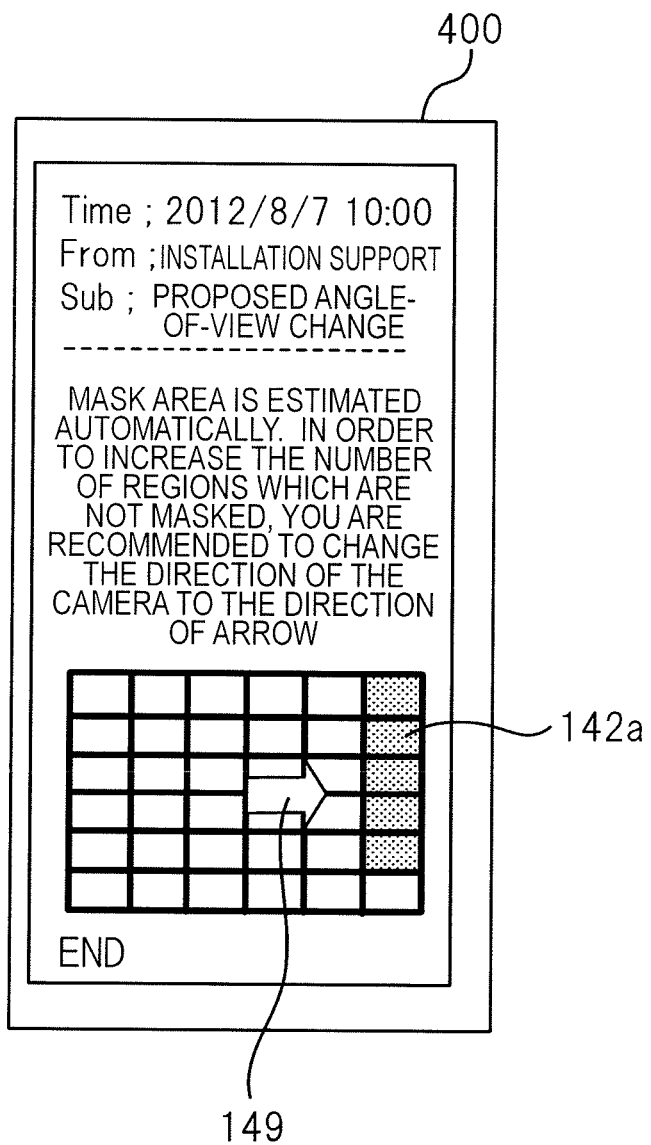
FIG. 31 is a diagram illustrating an example of a screen display in a portable terminal.

In addition, in the imaging device 14 according to Embodiment 9, a GUI for changing the angle of view is transmitted to a portable terminal or the like by adding transmission means, and thus may be displayed on the portable terminal. In this case, a transmission timing may be specified in advance (for example, after one minute, after ten minutes, after one hour, after two hours, and the like). This allows a user to easily set an angle of view having a tendency to perform automatic diaphragm adjustment while viewing the display unit of the portable terminal. FIG. 31 is a diagram illustrating an example of a screen display in a portable terminal 400. The drawing shows a screen display example in the case of FIG. 27 mentioned above, images are viewed only in the right blocks (regions close to the brightness of a face) 142a. Remaining blocks serve as mask regions and thus are painted out in white. In addition, a rightward arrow 149 is synthesized.

In addition, in the imaging device 14 according to Embodiment 9, the camera installation support device 307 may be built in the camera 2 rather than the recorder 3C.

Embodiment 10

Figure 32:
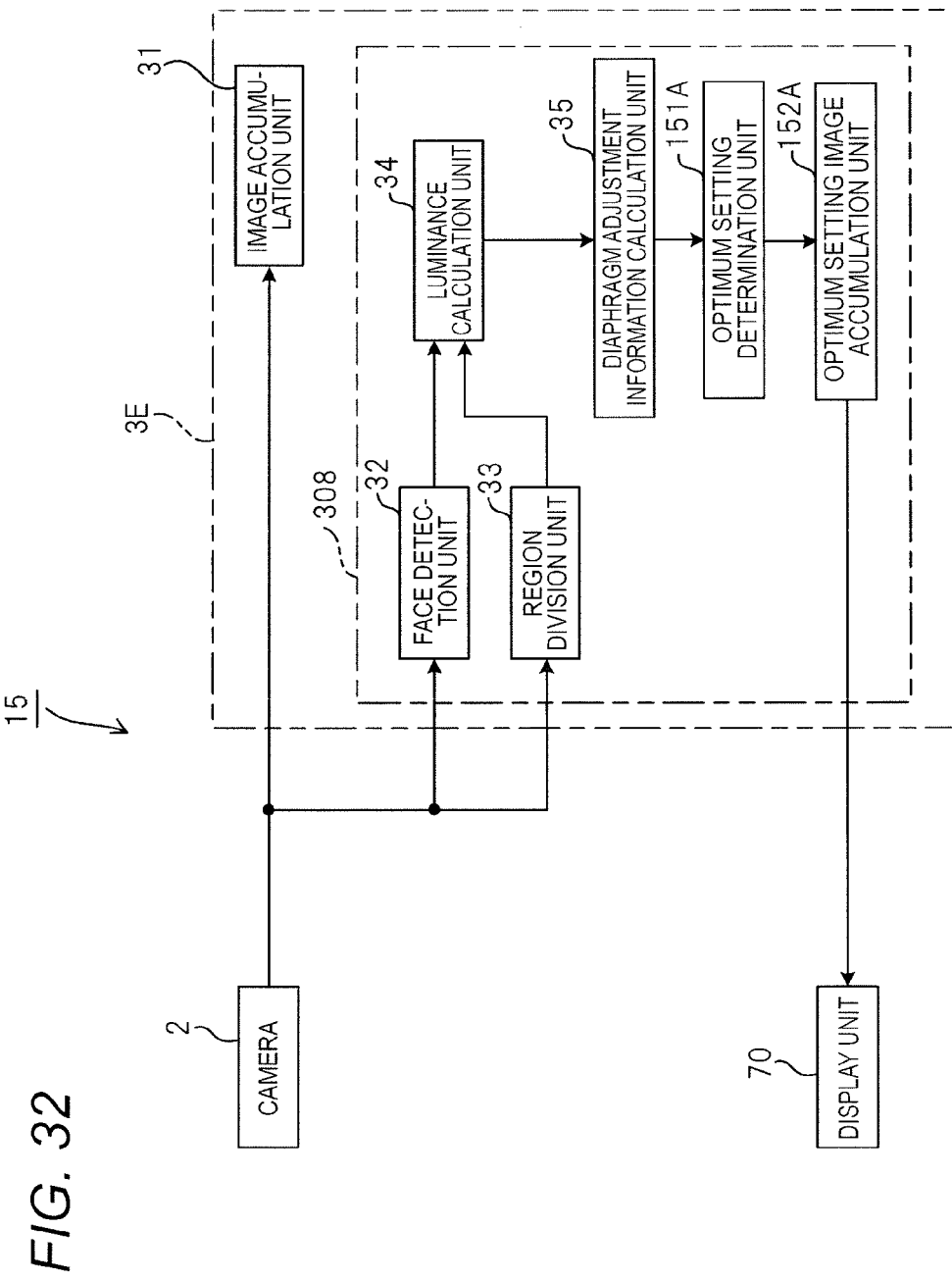
FIG. 32 is a block diagram illustrating a schematic configuration of an imaging device according to Embodiment 10 of the present invention.

FIG. 32 is a block diagram illustrating a schematic configuration of an imaging device according to Embodiment 10 of the present invention. Meanwhile, in the drawing, components common to those in FIGS. 1 and 20 mentioned above are denoted by the same reference numerals and signs. A recorder 3E of an imaging device 15 according to Embodiment 10 includes a camera installation support device 308 constituted by the face detection unit 32, the region division unit 33, the luminance calculation unit 34, the diaphragm adjustment information calculation unit 35, an optimum setting determination unit 151A and an optimum setting image accumulation unit 152A. The camera installation support device 308 accumulates images in which appropriate photometric regions are present, and displays the accumulated images. The displays of the accumulated images are lined up in order from, for example, the great appropriateness (evaluation value) of the photometric region. With the camera installation support device 308, when no appropriate photometric region is present, a user can reproduce past appropriate photometric regions while viewing a list display (for example, images imaged in past photometric regions are placed within an angle of view).

Figure 33:
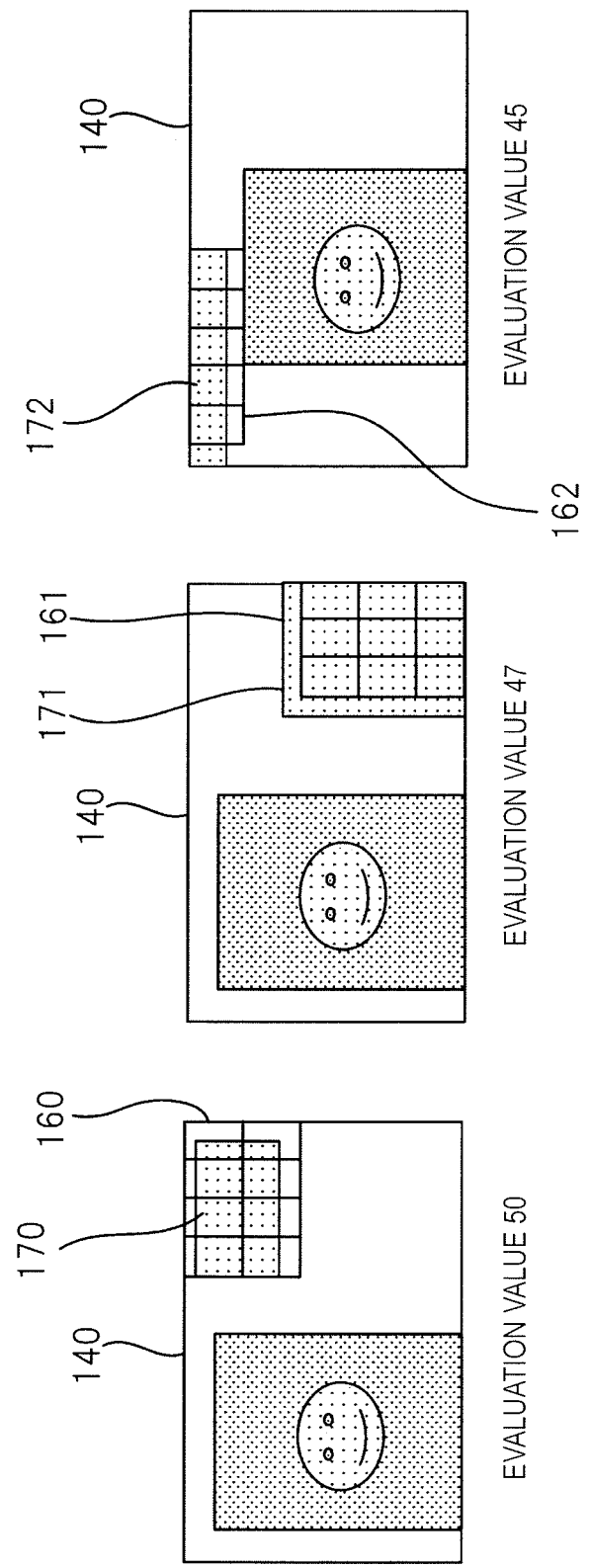
FIG. 33 is a diagram illustrating a list display of past images including an appropriate photometric region in the imaging device of FIG. 32.

The optimum setting determination unit 151A obtains the evaluation value of the photometric region. The optimum setting image accumulation unit 152A accumulates images in which the evaluation value of the photometric region satisfies a predetermined reference. Images accumulated in order from the great evaluation value of the photometric region are displayed on the display unit 70. FIG. 33 is a diagram illustrating an example (order of the great evaluation value) of a list display of past images including appropriate photometric regions. In the drawing, the evaluation value of an image in which a place having a poster 170 attached thereto is set to a photometric region 160 is set to "50", the evaluation value of an image in which a place having a rack 171 disposed thereon is set to a photometric region 161 is set to "47", and the evaluation value of an image in which a place having a poster 172 attached thereto is set to a photometric region 162 is set to "45".

Figure 34:
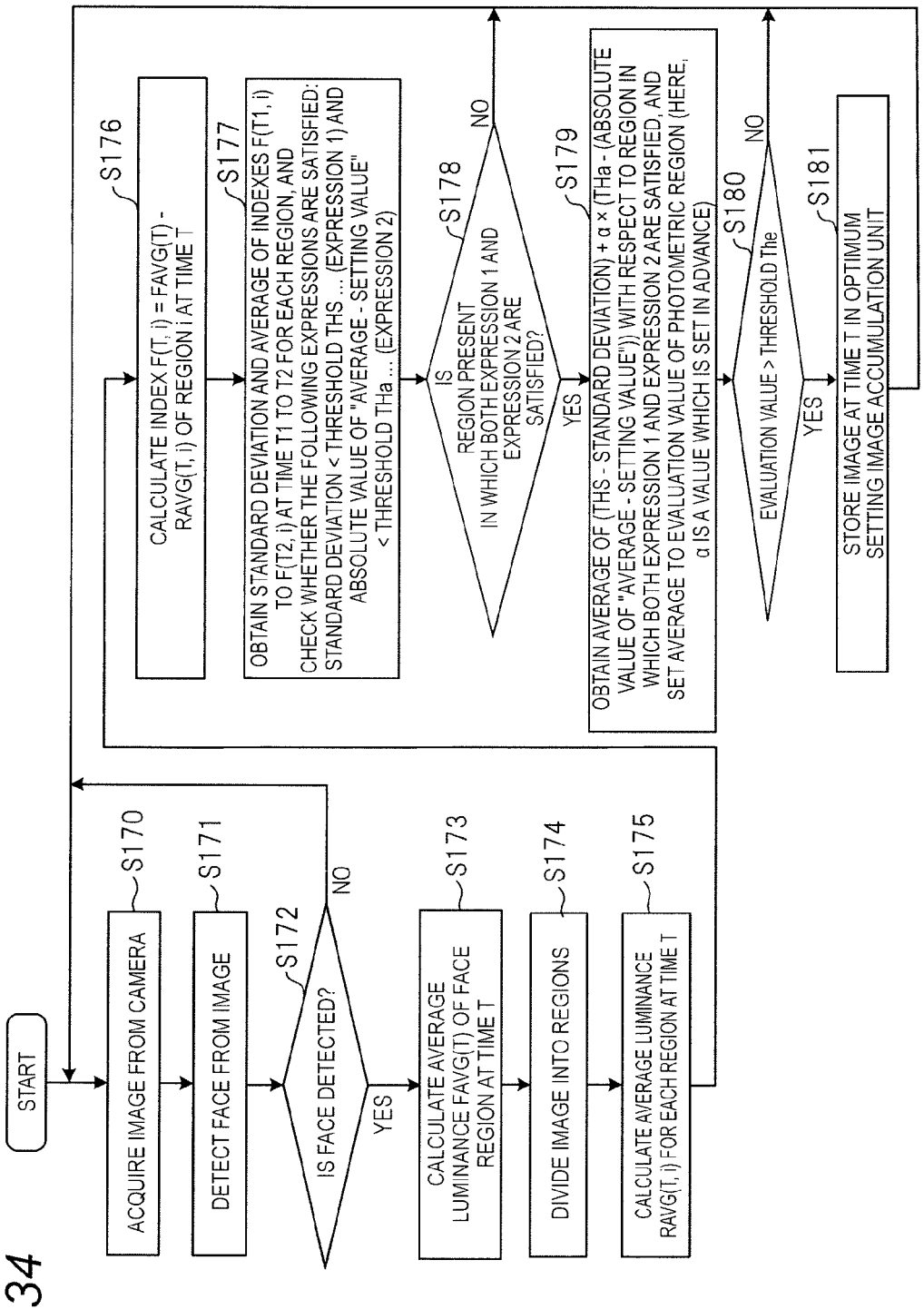
FIG. 34 is a flowchart illustrating a camera installation support process in the imaging device of FIG. 32.

FIG. 34 is a flowchart illustrating a camera installation support process of the imaging device 15 according to Embodiment 10. In the drawing, the face detection unit 32 first acquires an image from the camera 2 (step S170), and detects a person's face (step S171). Whether the person's face can be detected is then determined (step S172). When the face cannot be detected (that is, when the determination result of step S172 is "No"), the process from step S170 is resumed. When the face can be detected (that is, when the determination result of step S172 is "Yes"), the luminance calculation unit 34 calculates average luminance FAVG(T) of a face region at time T (step S173). After the luminance calculation unit 34 calculates the average luminance FAVG (T), the region division unit 33 divides an image, which is simultaneously acquired in the face detection unit 32, into regions (step S174). Meanwhile, the division of the image can be performed by not only block division, but also such a segmentation process as to arrange regions having the same color.

After the region division unit 33 divides the image into regions, the luminance calculation unit 34 calculates average luminance RAVG(T, i) for each region at time T (step S175). Here, "T" refers to a time, and "i" refers to an i-th region. After the average luminance RAVG(T, i) is calculated, the diaphragm adjustment information calculation unit 35 calculates index F(T, i)=FAVG(T)−RAVG(T, i) of a region i at time T (step S176). Next, a standard deviation and an average of indexes F(T1, i) to F(T2, i) at time T1 to T2 are obtained for each region, and whether standard deviation<threshold THS . . . (Expression 1) and the absolute value of "average−setting value"<threshold THa . . . (Expression 2) are established is checked (step S177). Here, the setting value refers to a parameter (for example, "0") which is set in advance.

It is then determined whether a region in which both Expression 1 and Expression 2 are satisfied is present (step S178). When it is determined that the region is present (that is, when the determination result of step S178 us "Yes"), the optimum setting determination unit 151A obtains an average of (THS−standard deviation)+α×(THa−(absolute value of "average−setting value")) with respect to the region in which both Expression 1 and Expression 2 are satisfied, and sets the average to the evaluation value of the photometric region (step S179). However, α is a value which is set in advance. Next, the optimum setting determination unit 151A determines whether the evaluation value of the photometric region in the image at time T is larger than a predetermined threshold THe (step S180). When the evaluation value is equal to or less than the threshold THe (that is, when the determination result of step S180 is "No"), the process from step S170 is resumed. When the evaluation value of the photometric region in the image at time T is larger than the predetermined threshold THe (that is, when the determination result of step S180 is "Yes"), the image at time T is stored in the optimum setting image accumulation unit 152A (step S181). After this process is performed, the process from step S170 is resumed.

In this manner, according to the imaging device 15 of Embodiment 10, when a face is detected from the image photographed in the camera 2, the average luminance FAVG (T) of the face region at time T is calculated, and then the average luminance RAVG(T, i) for each region at time T is calculated by dividing the image into regions. Thereafter, index F(T, i)=FAVG(T)−RAVG(T, i) of the region i at time T is calculated, and the standard deviation and the average of the indexes F(T1, to F(T2, 1) at time T1 to T2 of each region i are obtained for each region. When the region in which both standard deviation<threshold THS and the absolute value of "average−setting value"<threshold THa are satisfied is present, an average of (THS−standard deviation)+α×(THa−(absolute value of "average−setting value")) is obtained with respect to the region, and is set to the evaluation value of the photometric region. When the evaluation value of the photometric region in the image at time T is larger than the predetermined threshold THe, the image at time T is stored. Therefore, when no appropriate photometric region is present, a user can reproduce past appropriate photometric regions while viewing a list display.

As a hardware configuration of each of the imaging devices 1, 4, 5, 9, 11 to 15 according to Embodiments 1, 2, 3, 5 to 10 mentioned above and a hardware configuration of the image display device 6 according to Embodiment 4, it is possible to use a computer including a CPU (central processing unit), a volatile memory such as a RAM, a nonvolatile memory such as a ROM, an interface, and the like.

In addition, programs in which respective functions of the exposure control device 300 to 304 according to Embodiments 1, 2, 3, 5, and 6, the image display device 6 according to Embodiment 4 and the camera installation support devices 305 to 308 according to Embodiments 7 to 10 are described can also be stored and distributed in recording mediums such as a magnetic disk, a hard disk, an optical disk, a magneto-optical disk, and a semiconductor memory.

Although the present invention has been described in detail with reference to specific embodiments, it will be obvious by those skilled in the art that various changes and modifications can be made without departing from the spirit and scope of the present invention.

The present application is based on Japanese Patent Application No. 2011-281704, filed on Dec. 22, 2011, the contents of which are incorporated herein by reference.

INDUSTRIAL APPLICABILITY

The present invention is effective in that appropriate diaphragm adjustment can be performed even when a face is not imaged for a long period of time or the brightness of the face is different depending on a period of time, and can be applied to a monitoring camera system and the like.

REFERENCE SIGNS LIST 1, 4, 5, 9, 11 to 15: IMAGING DEVICE
2, 8: CAMERA
2A: PTZ CAMERA
3, 3A, 3B, 3C, 3E, 10: RECORDER
6: IMAGE DISPLAY DEVICE
7: NETWORK
21, 38: IMAGING UNIT
22: DIAPHRAGM ADJUSTMENT UNIT
31: IMAGE ACCUMULATION UNIT
32: FACE DETECTION UNIT
33: REGION DIVISION UNIT
34: LUMINANCE CALCULATION UNIT
35: DIAPHRAGM ADJUSTMENT INFORMATION CALCULATION UNIT
36: DYNAMIC RANGE EXPANSION PROCESSING UNIT
37: LIGHT AMOUNT ADJUSTMENT INFORMATION CALCULATION UNIT
41: PHOTOMETRIC REGION EXTRACTION UNIT
51: BACKGROUND IMAGE CREATION UNIT
61: LUT
62: LUT CALCULATION UNIT
63: IMAGE DISPLAY UNIT
70: DISPLAY UNIT
71: MINIMUM ANGLE-OF-VIEW INPUT UNIT
105: SAMPLE EXTRACTION UNIT
121, 131: RECOMMENDED ANGLE-OF-VIEW DETERMINATION UNIT
141A: ANGLE-OF-VIEW ADJUSTMENT METHOD DETERMINATION UNIT
151A: OPTIMUM SETTING DETERMINATION UNIT
152A: OPTIMUM SETTING IMAGE ACCUMULATION UNIT
270: SAMPLE
300 to 304: EXPOSURE CONTROL DEVICE
305 to 308: CAMERA INSTALLATION SUPPORT DEVICE
400: PORTABLE TERMINAL

The invention claimed is:

1. An exposure control device comprising:
an object detector, adapted to detect an object from an image which is input to the object detector from an imaging unit;
a region divider, adapted to divide an imaging region of the input image;
a luminance calculator, adapted to calculate luminance of an object region detected by the object detector and luminance of a divided region obtained by dividing by the region divider; and
a diaphragm adjustment information calculator, adapted to obtain the divided region having a difference between the luminance of the object region and the luminance of the divided region which is larger than a predetermined value, and to determine a region, excluding the divided region, as a diaphragm adjustment region of the imaging unit when the difference between the luminances is larger than the predetermined value and the luminance of the object region is lower than the luminance of the divided region.

2. The exposure control device according to claim 1, wherein
the object detector detects an object from each of images input to the object detector from a plurality of imaging units which have different exposure times,
the region divider divides the imaging region for each of the images photographed in different exposure times; and
the diaphragm adjustment information calculator obtains the divided region having a difference between the luminance of the object region and the luminance of the divided region which is larger than the predetermined value for each of the images photographed in different exposure times and determines a region, excluding the divided region, having the large difference between the luminances as a diaphragm adjustment region of each of the plurality of imaging units.

3. An exposure control device comprising:
an object detector, adapted to detect an object from an image which is input to the object detector from an imaging unit;
a region divider, adapted to divide an imaging region of the input image;
a luminance calculator, adapted to calculate luminance of an object region detected by the object detector and luminance of a divided region obtained by dividing by the region divider; and
a diaphragm adjustment information calculator, adapted to obtain the divided region having a change in difference between the luminance of the object region and the luminance of the divided region which is larger than a predetermined value, and to determine a region, excluding the divided region, having the large change in difference between the luminances as a diaphragm adjustment region of the imaging unit.

4. An exposure control device comprising:
an object detector, adapted to detect an object from an image which is input to the object detector from an imaging unit;

a region divider, adapted to divide an imaging region of the input image;

a luminance calculator, adapted to calculate luminance of an object region detected by the object detector and luminance of a divided region obtained by dividing by the region divider; and a diaphragm adjustment information calculator, adapted to obtain the divided region having a difference between the luminance of the object region and the luminance of the divided region which is smaller than a predetermined value, and to determine the divided region having the small difference between the luminances as a diaphragm adjustment region of the imaging unit; wherein the diaphragm adjustment information calculator adjusts a diaphragm based on the luminance obtained in the divided region by the luminance calculator and used for calculation of the difference by the diaphragm adjustment information calculator.

5. An exposure control device comprising:

an object detector, adapted to detect an object from an image which is input to the object detector from an imaging unit;

a region divider, adapted to divide an imaging region of the input image;

a luminance calculator, adapted to calculate luminance of an object region detected by the object detector and luminance of a divided region obtained by dividing by the region divider; and a diaphragm adjustment information calculator, adapted to obtain the divided region having a change in difference between the luminance of the object region and the luminance of the divided region which is smaller than a predetermined value, and to determine the divided region having the small change in difference between the luminances as a diaphragm adjustment region of the imaging unit.

6. An imaging device comprising:

the exposure control device according to claim 1, an imaging unit; and a diaphragm adjustor, wherein the exposure control device obtains the diaphragm adjustment region using the image which is input to the exposure control device from the imaging unit, and the diaphragm adjustor performs diaphragm adjustment of the imaging unit using the diaphragm adjustment region determined by the diaphragm adjustment information calculator.

7. An exposure control method of calculating a diaphragm adjustment region by a programmed computer, comprising:

detecting an object from an image which is input from an imaging unit;

dividing an imaging region of the input image;

calculating luminance of an object region detected in the object detection and luminance of a divided region obtained by dividing the imaging region; and obtaining the divided region having a difference between the luminance of the object region and the luminance of the divided region which is larger than a predetermined value, and determining a region, excluding the divided region, as a diaphragm adjustment region of the imaging unit when the difference between the luminances is larger than the predetermined value and the luminance of the object region is lower than the luminance of the divided region.

8. The exposure control method according to claim 7, wherein the object detection detects an object from each of images input from a plurality of imaging units which have different exposure times, the region division divides the imaging region for each of the images photographed in different exposure times, and the diaphragm adjustment information calculation obtains the divided region having a difference between the luminance of the object region and the luminance of the divided region which is larger than the predetermined value for each of the images photographed in different exposure times and determines a region excluding the divided region having the large difference between the luminances as a diaphragm adjustment region of each of the plurality of imaging units.

9. An exposure control method, comprising:

detecting an object from an image input from an imaging unit;

dividing an imaging region of the input image;

calculating luminance of an object region detected in the object detection and luminance of a divided region obtained by dividing the imaging region; and obtaining the divided region having a difference between the luminance of the object region and the luminance of the divided region which is larger than a predetermined value and determining a region, excluding the divided region, as a diaphragm adjustment region of the imaging unit, when the difference between the luminances is larger than the predetermined value and the luminance of the object region is lower than the luminance of the divided region.

10. An exposure control method, comprising:

detecting an object from an image input from an imaging unit;

dividing an imaging region of the input image;

calculating luminance of an object region detected in the object detection and luminance of a divided region obtained by dividing the imaging region; and obtaining the divided region having a change in difference between the luminance of the object region and the luminance of the divided region which is smaller than a predetermined value, and determining the divided region having the smaller change in difference between the luminances, as a diaphragm adjustment region of the imaging unit.

* * * * *